(12) United States Patent
Ren et al.

(10) Patent No.: US 10,012,775 B2
(45) Date of Patent: Jul. 3, 2018

(54) COMPOSITE FILTER FOR VISIBLE LIGHT TRANSMISSION AND LONG WAVE REFLECTION

(71) Applicant: University of Houston System, Houston, TX (US)

(72) Inventors: Zhifeng Ren, Houston, TX (US); Tianyi Sun, Houston, TX (US); Chuanfei Guo, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 161 days.

(21) Appl. No.: 14/698,247

(22) Filed: Apr. 28, 2015

(65) Prior Publication Data

US 2015/0309229 A1 Oct. 29, 2015

Related U.S. Application Data

(63) Continuation-in-part of application No. 14/298,090, filed on Jun. 6, 2014.

(60) Provisional application No. 61/991,117, filed on May 9, 2014, provisional application No. 61/838,796, filed on Jun. 24, 2013.

(51) Int. Cl.
| | | |
|---|---|---|
| *G02B 5/28* | (2006.01) |
| *H01B 1/02* | (2006.01) |
| *B82Y 20/00* | (2011.01) |
| *B82Y 30/00* | (2011.01) |
| *B82Y 40/00* | (2011.01) |

(52) U.S. Cl.
CPC ............. *G02B 5/282* (2013.01); *G02B 5/285* (2013.01); *H01B 1/02* (2013.01); *B82Y 20/00* (2013.01); *B82Y 30/00* (2013.01); *B82Y 40/00* (2013.01); *Y10S 977/762* (2013.01); *Y10T 428/12424* (2015.01); *Y10T 428/24331* (2015.01)

(58) Field of Classification Search
None
See application file for complete search history.

(56) References Cited

U.S. PATENT DOCUMENTS

| | | | | |
|---|---|---|---|---|
| 2002/0167619 A1* | 11/2002 | Bietsch | ............. | G03B 21/28 348/739 |
| 2012/0152295 A1* | 6/2012 | Matus | ............. | H01L 35/34 136/200 |
| 2012/0186621 A1* | 7/2012 | Kim | ............. | H01B 1/06 136/200 |
| 2012/0268809 A1* | 10/2012 | Guo | ............. | G02F 1/216 359/359 |
| 2013/0182405 A1* | 7/2013 | Kaufman | ............. | G02F 1/13439 362/19 |

\* cited by examiner

*Primary Examiner* — Vera Katz
(74) *Attorney, Agent, or Firm* — Conley Rose, P.C.

(57) ABSTRACT

Systems and methods disclosed herein are directed towards the fabrication of a nanomesh composite filter (NCF) that can be manufactured according to various embodiments, all of which are intended to be fabricated in order to control the transmission, reflection, and absorption of various wavelengths bands. In particular, the disclosed embodiments may be used for heat shielding applications where certain wavelength ranges may be desirable to transmit and others may be desirable to reflect.

20 Claims, 20 Drawing Sheets

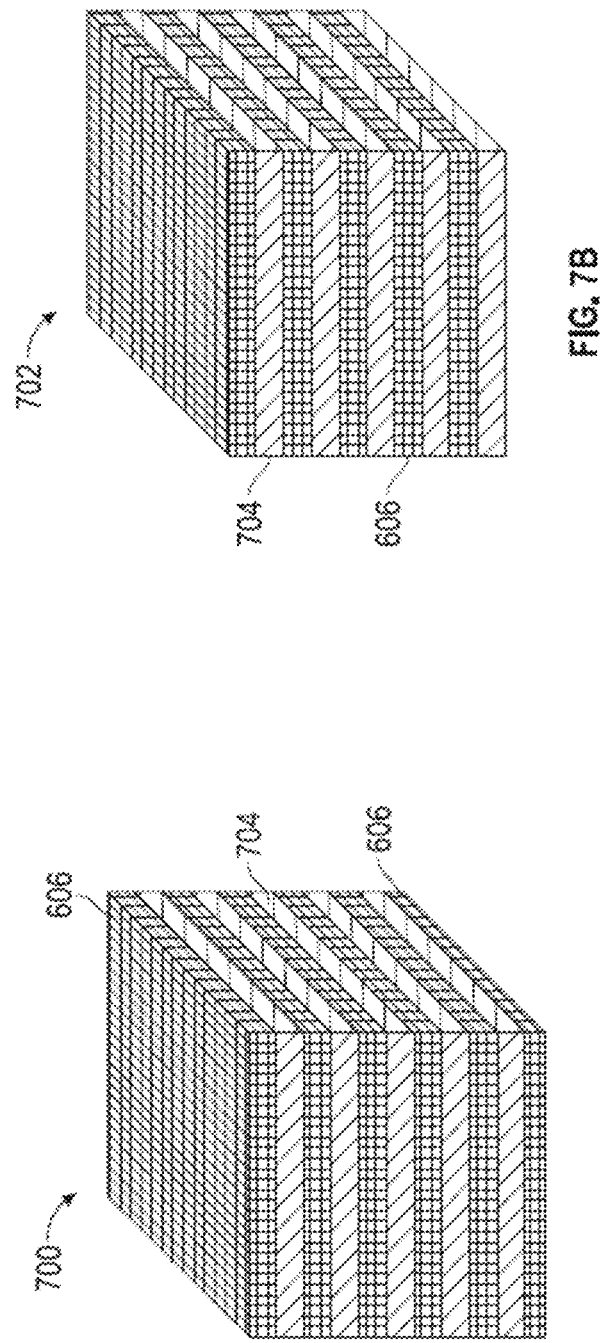

FIGS. 14A-14D
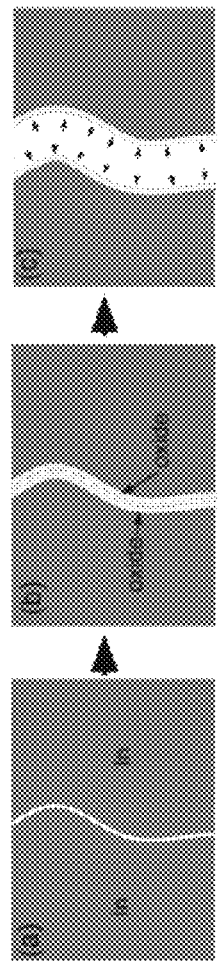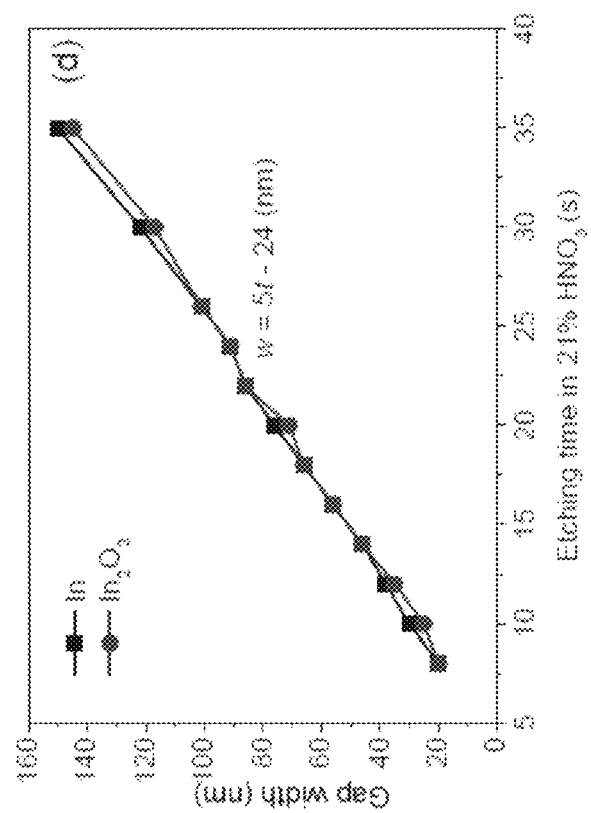

# COMPOSITE FILTER FOR VISIBLE LIGHT TRANSMISSION AND LONG WAVE REFLECTION

CROSS-REFERENCE TO RELATED APPLICATIONS

This application claims priority to U.S. Prov. Pat. App. No. 61/991,117 "Composite Filter for visible Light Transmission and Long Wave Reflection," filed May 9, 2014, which is incorporated in its entirety herein. This application is also a continuation in part of, and further claims priority to, U.S. utility patent application Ser. No. 14/298,090, filed Jun. 6, 2014, entitled "Metallic Nanomesh," which is incorporated in its entirety herein.

STATEMENT REGARDING FEDERALLY SPONSORED RESEARCH OR DEVELOPMENT

The work disclosed in this application was funded by the Department of Energy under grant DE-FG02-00ER45805 and DE-SC0010831.

BACKGROUND

Background of the Technology

In recent years, studies have been conducted on membranes and films to improve the heat-shielding properties of glasses, in hope of finding a selective coating that has high reflectance in the infrared region where thermal energy is great, while transmitting a wavelength in the visible-light region. One such example of selective reflector is alternating ZnO and Al layers. Yet, due to the use of continuous metallic films, such as the Al films, many high-heat-shielding structures do not have high visible-light transmittance and many high-transmittance materials or designs do not have high reflectance in the longer wavelength.

BRIEF SUMMARY OF THE DISCLOSURE

In an embodiment, a heat-shielding structure, comprising: a plurality of nanocomposite filters, wherein each nanocomposite filter of the plurality of nanocomposite filters comprises: a substrate; a plurality of dielectric layers; and a plurality of nanomesh structures; wherein a first nanomesh structure of the plurality of nanomesh structures is disposed on the substrate; and wherein the plurality of dielectric layers are disposed in an alternating fashion with the plurality of nanomesh structures, wherein each structure of the plurality of nanomesh structures comprises a plurality of metallic wires and a plurality of holes formed by an arrangement of the plurality of metallic wires.

In an alternate embodiment, a heat-shielding structure, comprising: a plurality of nanocomposite filters, wherein each nanocomposite filter of the plurality of nanocomposite filters comprises: a substrate; a plurality of dielectric layers of a first composition; a plurality of dielectric layers of a second composition; wherein each of the plurality of dielectric layers of a first composition are disposed in an alternating fashion with each of the plurality of dielectric layers of the second composition thereby constituting a layer stack; and a nanomesh structure disposed in contact with the layer stack and the substrate.

In an embodiment, composite filter comprising: a plurality of dielectric layers; and a plurality of nanomesh structures, each of the nanomesh structures comprising a plurality of metallic wires and a plurality of holes formed by an arrangement of the plurality of metallic wires; wherein the plurality of dielectric layers are disposed in an alternating fashion with the plurality of nanomesh structures, and wherein the plurality of dielectric layers comprises at least a first layer formed of a first composition of dielectric and a second layer formed of a second composition of dielectric In an alternate embodiment, a composite filter comprising: a plurality of nanomesh structures, a substrate, and a plurality of dielectric layers; wherein a first nanomesh structure of the plurality of nanomesh structures is disposed on the substrate, wherein a first dielectric layer is disposed on the first nanomesh structures, and wherein each of the plurality of dielectric layers are disposed in an alternating fashion with each of the plurality of nanomesh structures.

In an alternate embodiment, a composite filter comprising: a dielectric stack, comprising: a plurality of dielectric layers of a first composition; a plurality of dielectric layers of a second composition, wherein the first composition is different from the second composition; wherein each of the plurality of dielectric layers of a first composition are disposed in an alternating fashion with each of the plurality of dielectric layers of the second composition; and a nanomesh structure disposed in contact with the dielectric stack, wherein the nanomesh structure is in contact with either a dielectric layer of the first composition or a dielectric layer of the second composition.

Exemplary embodiments described herein comprise a combination of features and characteristics intended to address various shortcomings associated with certain prior devices, compositions, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the exemplary embodiments disclosed herein, reference will now be made to the accompanying drawings in which:

FIGS. 7A and 7B are schematic illustrations of composite nanomesh filters fabricated according to certain embodiments of the present disclosure.

FIGS. 14A-14D illustrate schematically the steps of surface oxidation-acidic etching in diluted $HNO_3$ and the dependence of gap width on etching time.

DETAILED DESCRIPTION OF THE DISCLOSED EMBODIMENTS

Figure 1:
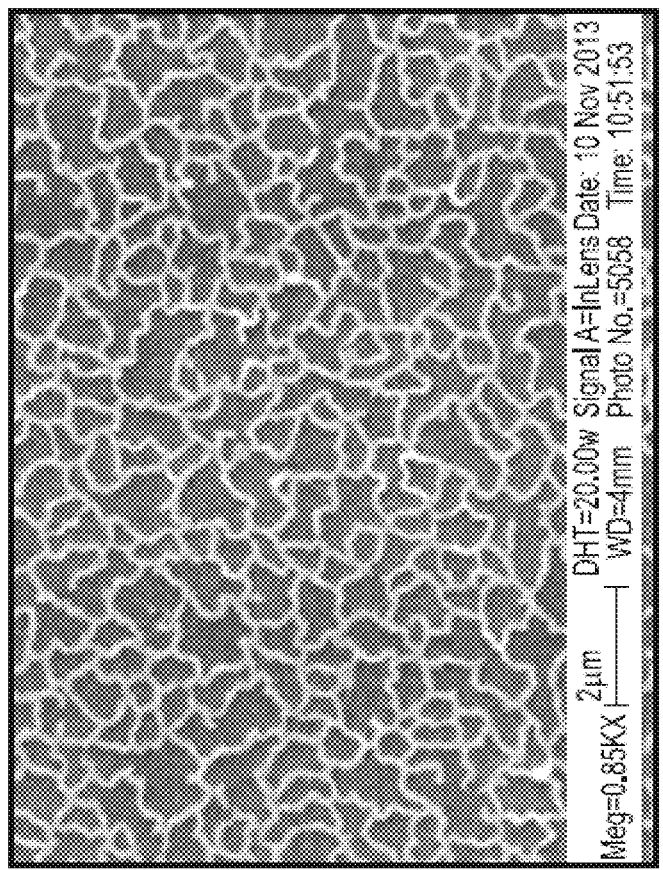
FIG. 1 is an SEM image of a gold (Au) nanomesh on a polydimethylsiloxane (PDMS) substrate fabricated according to certain embodiments of the present disclosure.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ."

When wavelengths of light encounter a surface, the wavelengths may be absorbed, reflected, or transmitted based upon factors that include the wavelength band, wavelength size, surface material and surface structure. The spectrum of light, which may be referred to as the electromagnetic spectrum, ranges from extremely low frequency (long wavelength) (ELF) waves through radio waves, infrared, visible light, x-rays, and gamma rays (short wavelength). In some applications, it may be desirable to have a material that reflects and transmits different wavelengths of light for heat shielding, visibility, or even cosmetic applications. In some applications, for example heat shielding applications, visible light transmission is desired but the transmission of longer wavelengths is not desired. Rather, the reflection of these longer wavelengths is desired. The materials, methods, structures, assemblies, and apparatuses discussed herein produce a coating that may be referred to herein as a nanomesh composite filter ("NCF") that may enable both visible light transmission and the reflection of the longer wavelengths, for example, those wavelengths above about 1 micron. FIGS. 10-15 discuss the fabrication of nanomesh that may be employed according to embodiments of the present disclosure.

Conventionally, alternating materials can exhibit band block properties in various optical ranges, such as ID photonic crystals. However, since the choice of materials and their corresponding optical constants are quite limited, existing optical filters work well only for narrow ranges of wavelength bands and can therefore not be used for a broad spectrum of applications. As such, due to the occurrence of high order resonance in shorter wavelength ranges, the high selectivity of such filters are restricted to a narrow range. As discussed herein, the successful fabrication of metallic nanomesh structures (referred to herein as "nanomeshes" or "nanomesh") provides the possibility of fabricating a filter using a metal with tunable optical behavior. "Tunable optical behavior" is the phrase used to describe the ability to optimize and a material's performance by, during the fabrication and manufacture process, selecting the materials and processing such that the optical behavior of the end product (e.g., what wavelengths are absorbed, transmitted, and reflected) is able to be targeted to a specific application. Thus, by combining metallic nanomesh with dielectric layers to form new designs of optical filters, referred to herein as nanomesh composite filters ("NCF"), a highly selective reflector is achieved that allows the transmission of visible light and the reflection of longer waves of light.

Optical Response of Metallic Nanomeshes

FIG. 1 is an SEM image of a gold (Au) nanomesh on a polydimethylsiloxane (PDMS) substrate that may be synthesized and utilized according to embodiments discussed herein. The introduction of the use of nanomeshes in optical applications makes it possible to achieve a low shading coefficient and high visible-light transmittance at the same time, since the nanomesh has a similar optical response in the IR range but much higher transmittance in the visible range, which can be tuned by the effective mesh sizes. That is, the nanomesh structures discussed herein can be customized for various applications and transmittance preferences/requirements.

Figure 2A:
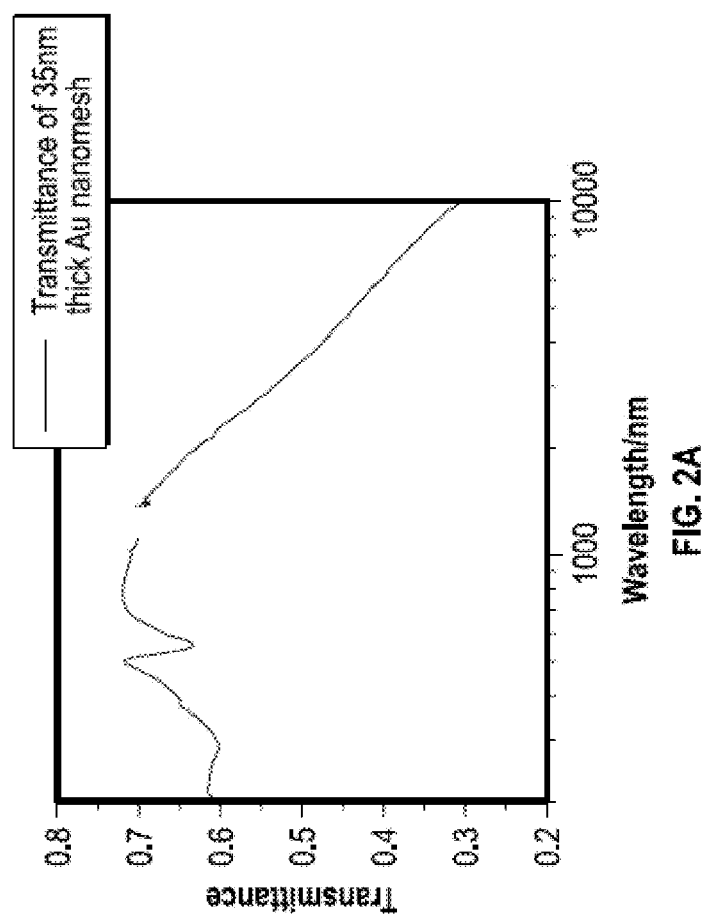
FIG. 2A is the measured transmittance spectra of gold (Au) nanomesh fabricated according to certain embodiments of the present disclosure on a $CaF_2$ substrate in the UV-VIS-IR-MIR light ranges.

FIG. 2A is the measured transmittance spectra of gold (Au) nanomeshes on a $CaF_2$ substrate in the UV-VIS-IR-MIR light ranges. Electromagnetic waves can be shielded by wire-mesh systems where the effective hole sizes are smaller than wavelengths, as indicated in FIG. 2A. The nanomesh structures discussed herein may be formed by a plurality of metallic wires or by a plurality of other metallic components such as nano-rods, spheres, cubes, rectangles, irregularly shaped components, or combinations thereof.

Figure 2B:
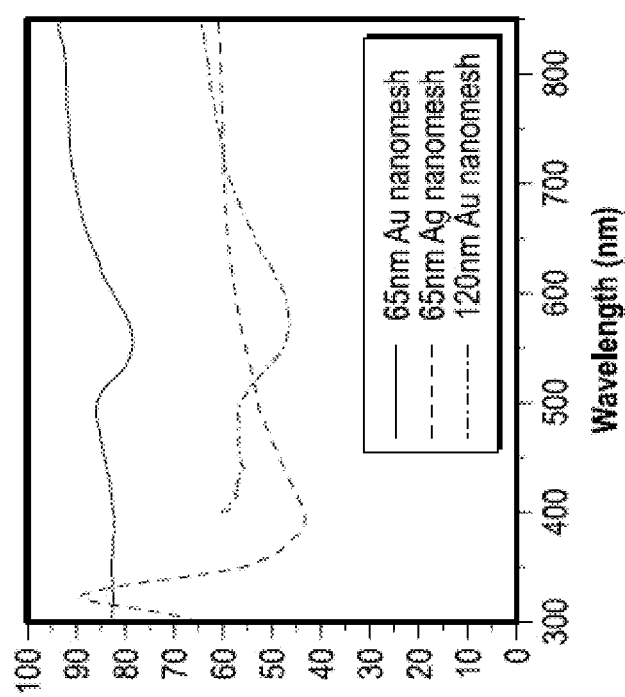
FIG. 2B is the measured transmittance spectra of gold (Au) and silver (Ag) nanomesh fabricated according to certain embodiments of the present disclosure in the visible range with nanowire thicknesses of 65 nm and 120 nm.

FIG. 2B is the measured transmittance spectra of gold (Au) and silver (Ag) nanomeshes in the visible range with nanowire thicknesses of 65 nm and 120 nm.

In one embodiment, a gold (Au) nanomesh is synthesized with a hole size of about 1 micron and metal wires comprising the nanomesh that are each about 65 nm thick. In alternate embodiments, the hole size of a nanomesh structure may range from 0.001 nm-5 nm. FIG. 2B illustrates that the Au nanomesh presents a transmittance of ~85% in the VIS-NIR range of 300-850 nm at normal incidence (indicated as the black line in FIG. 2B). This transmittance may be tuned to 55% by changing the wire thickness from about 65 nm to about 120 nm (indicated by the blue line in FIG. 2B).

FIG. 2B also illustrates that a silver (Ag) nanomesh is not so transparent (indicated by the red line in FIG. 2B) due to the good reflection properties of Ag. In some embodiments, copper (Cu) nanomeshes also yield a very good transmittance, which may in some cases be equal to or better than the transmittance of Au nanomeshes.

Figure 2C:
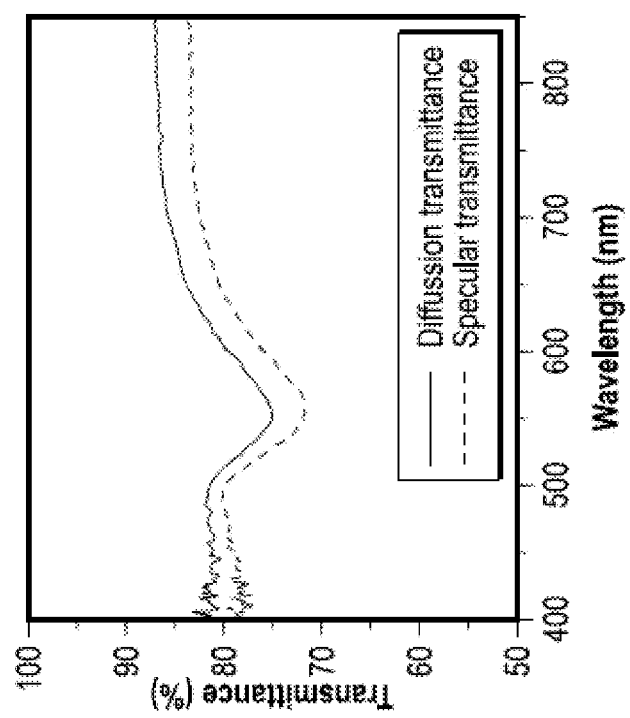
FIG. 2C is the measured diffusion and specular transmittances of gold (Au) nanomesh fabricated according to certain embodiments of the present disclosure.

FIG. 2C is the measured diffusion and specular transmittances of gold (Au) nanomeshes In FIG. 2C, the small difference (3%) between the diffusion and specular transmittances of the Au nanomesh indicates that the nanomesh has quite small haze, a may be a very desirable feature for optical filtering and a good feature for applications. This small haze may be due to the small roughness of the structures. The optical response of the metallic nanomeshes can be simulated using effective medium models, such as Lorentz-Drude model. But when using these models, the effective thickness is different from that of the nanomeshes.

Fabrication of Nanomesh Structures

The fabrication of a nanomesh structure (which may also be referred to simply as "nanomesh" or "nanomeshes") may be accomplished, for example, using grain boundary lithography. In the fabrication process, a passivated metal with a low melting point was used. This metal may be, for example, such as aluminum, or tin, or indium, or bismuth as the mask layer, and an oxide layer ($SiO_2$) as the sacrificial layer. Nanomeshes can be made of common metals (including but not limited to iron, copper, tantalum, silver, and gold), by depositing a metal film on the passivated mask layer. Oxide films like $SiO_2$ or $TiO_2$ or $Al_2O_3$ are used as protective layers and transmission tuning layers on the metal nanomesh. Chemicals including $HNO_3$, HF, and KOH may be used in the fabrication process. The extinction coefficient in the visible range plays an important role in the VIS transmission. In this case, among common metals, Au, Ag, Cu, and Ta could be the best possible candidates, but in some embodiments Au may be preferred due to its resistance to oxidation. In other embodiments, other metals may also be used depending upon the end application and any intermediate processing that may favor one composition/material over another.

Fabrication of the Dielectric:

The dielectric layers can be deposited by using magnetron sputtering, or other methods including but not limited to e-beam evaporation, thermal evaporation, and PVD techniques. In an embodiment, a predetermined number of dielectric layers, including layers that alternate in thickness, composition, or both, may be referred to as a whole as a "stack," a "layer stack," a "dielectric layer stack," or a "dielectric stack."

Design of the Nanomesh Composite Filter

Turning now to the embodiments of NCFs illustrated in FIGS. 6, 7A, 7B, 8A, and 8B, it is understood that these figures are offered as examples and embodiments of possible NCF configurations but that the configurations of nanomesh composite filters are not limited to these examples/embodiments but are rather fabricated according to, for example, application requirements of an end product where the NCF may be employed.

Figure 6:
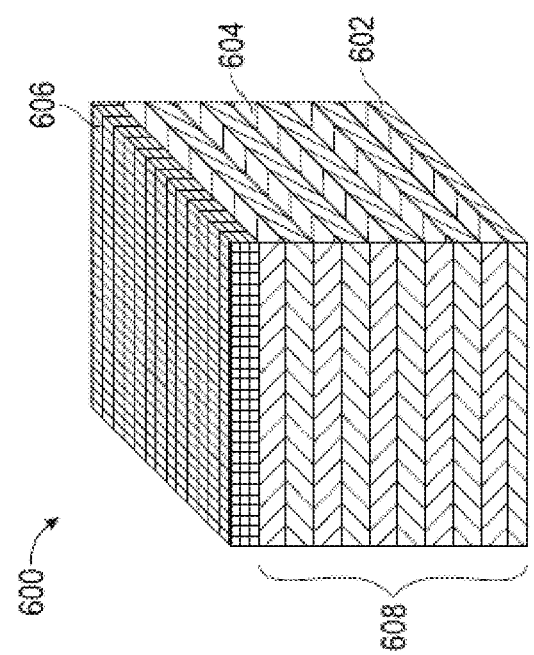
FIG. 6 is an illustration of a composite nanomesh filter according to embodiments of the present disclosure.

FIG. 6 is an illustration of a composite nanomesh filter according to embodiments of the present disclosure. In an embodiment, the nanomesh composite filter 600 comprises a first composition of dielectric layer 602 and a second composition of dielectric layer 604. The first composition 602 and the second composition 604 of dielectric layers are disposed in an alternating fashion for a predetermined number of iterations to form the dielectric layer stack 608. The predetermined number of iterations ("predetermined number") may be based upon the end application and/or further processing of the NCF. On at least one end of the dielectric layer stack 608, which may be disposed on glass in some embodiments, a nanomesh structure 606 is disposed. The dielectric layers 602 and 604 may comprise $TiO_2$, $SiO_2$, and $Al_2O_3$, and the first dielectric layer 602 may be different than the second composition 604. The nanomesh structure 606 may comprise gold (Au), silver (Ag), copper (Cu), tantalum (Ta), as well as alloys and combinations thereof. The nanomesh structure comprises a plurality of metallic wires that are arranged to form a plurality of holes, and the size of the holes as well as the thickness and composition of the metallic wires are used to tune (control) the transmissivity of the NCF.

Referring now to FIG. 7A, an NCF 700 comprises a plurality of alternating layers, where the alternating layers are a nanomesh structure 606 and a dielectric layer 704 that may be similar in thickness and/or composition to dielectric layers 604 or 602 from FIG. 6. FIG. 7B is an illustration of NCF 702 that is configured similarly to NCF 700 except that there is a nanomesh structure 606 disposed on only one side of the stacked layers of the NCF 702. In still other embodiments (not pictured) two dielectric layers may be disposed, then a nanomesh structure, and then two more dielectric layers that may be arranged in any pattern suitable for the end application and, more specifically, the heat-shielding and light-transmissivity appropriate for the end application or for further processing.

Figure 8B:
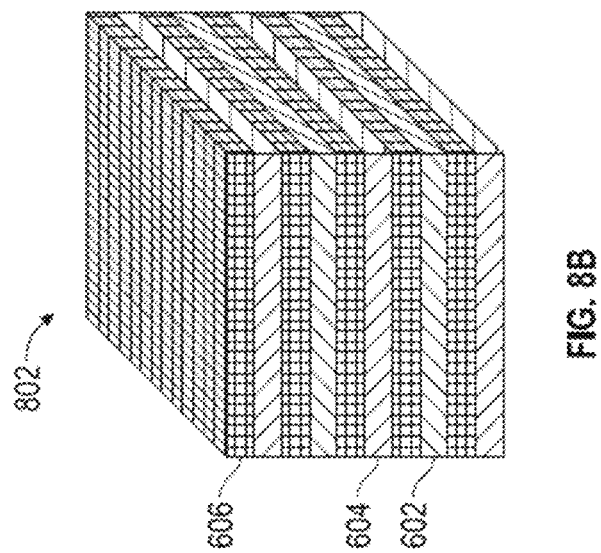
FIGS. 8A and 8B are schematic illustrations of composite nanomesh filters fabricated according to certain embodiments of the present disclosure.
Figure 8A:
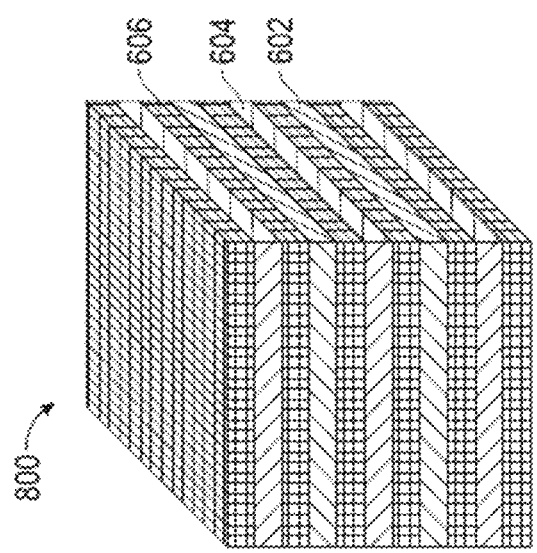

Turning to an embodiment in FIG. 8A, a plurality of dielectric layers are disposed in an alternating fashion with a plurality of nanomesh structures 606. The plurality of dielectric layers may comprise two or more compositions of dielectric layers, for example, layers 604 and 602 as shown in FIG. 6. In this embodiment, the layers may be disposed in a repeating fashion 606-604-602 and stacked until an appropriate number of layers have been disposed, which may be determined by the end application or further processing steps. In this embodiment, a nanomesh structure 606 may be present on one outer side (end) of the assembly (FIG. 8B) or on both ends (FIG. 8A). In other embodiments, more or less compositions of dielectric layers may be used, and in still other embodiments, different compositions of nanomesh structures 606 may also be used.

In any of FIGS. 6, 7A, 7B, 8A, and 8B, the layers of nanomesh structures and dielectrics may be of varying thicknesses, i.e. in a filter configuration where there is a single layer of nanomesh structure, the nanomesh structure layer may be of varying thicknesses, and may be thicker or thinner than all or some of the dielectric layers, which may vary in composition as well as thickness. In another example, in the alternating layer embodiments of FIGS. 7A, 7B, 8A, and 8B, the dielectric layers and nanomesh structures may be of varying thicknesses among and between the respective types of nanomesh structures and dielectric layers.

Figure 9:
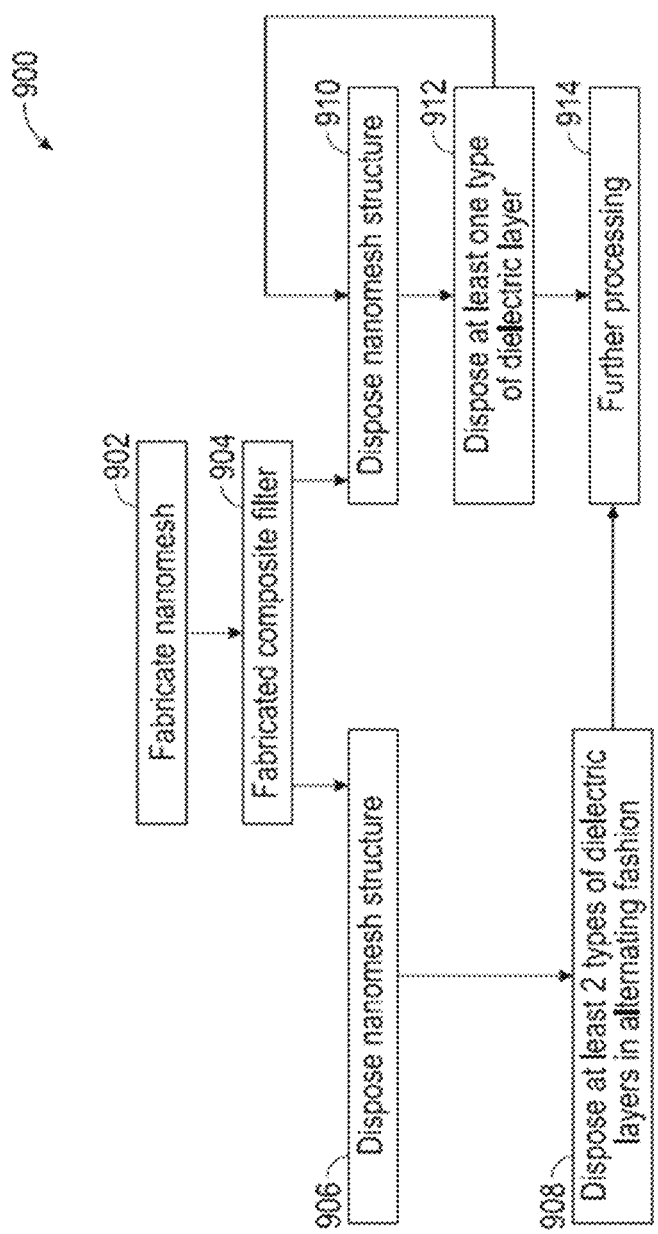
FIG. 9 is an embodiment of a the method 900 of fabricating a nanomesh composite filter according to certain embodiments of the present disclosure.

Referring to FIG. 9, the method 900 of fabricating a nanomesh composite filter, at block 902, a nanomesh structure is fabricated. The nanomesh structure comprises a plurality of wires that may be silver (Ag), gold (Au), tantalum (Ta), copper (Cu) or other materials (compositions) as appropriate for the end application or further processing. The plurality of wires may be arranged to form a plurality of holes of varying sizes, the sizes of which can be tuned in the manufacturing/fabrication process to filter a particular range of wavelengths of light. At block 904, the composite filter is assembled, and may be assembled at block 906 where a single layer of nanomesh structure may be disposed on a substrate. The substrate may be transparent, semi-transparent, opaque, translucent, or combinations thereof depending upon the end application. At block 908, at least two types (compositions) of dielectric layers are disposed in an alternating fashion (see FIG. 6) on top of the nanomesh structure. The dielectric layers may be disposed in varying fashions, where A, B, and C are layers of varying compositions, thickness, or both, including A/B/A/B/A/B, A/B/B/A/B/B/A, A/B/C/A/B/C, A/B/B/C/A/B/B/C, or in other configurations as appropriate for an end application or intermediate assembly step (not pictured here).

In some embodiments, the alternating dielectric layers may be disposed first, then the single layer of nanomesh in contact with the alternating dielectric layers (dielectric layer stack), and then the substrate disposed in contact with dielectric stack. These dielectric layers may be disposed in layers of equal thickness or in layers of varying thickness, or combinations thereof. After the composite filter is assembled, it may be further assembled, tested/validated, or processed at block 914 depending upon the end application.

In an alternate embodiment, at block 910, a first nanomesh structure may be disposed, for example, on a substrate. At block 912, at least one type of dielectric layer is disposed on the first nanomesh structure. Blocks 910 and 912 may be repeated for a predetermined number of cycles until the filter is complete. In some embodiments, alternating types (compositions) of the nanomesh structures and the dielectric layers may be used, for example, in formations such as A-1-B-2-A-1-B-2, A-1-A-2-A-1, A-1-B-1-A-1-B-1—where A and B are different compositions of nanomesh structures and wherein 1 and 2 are different compositions of dielectric layers. Just as in the embodiment in blocks 906 and 908, the filter fabricated at blocks 910 and 912 may be further processed at block 914.

Figure 3A:
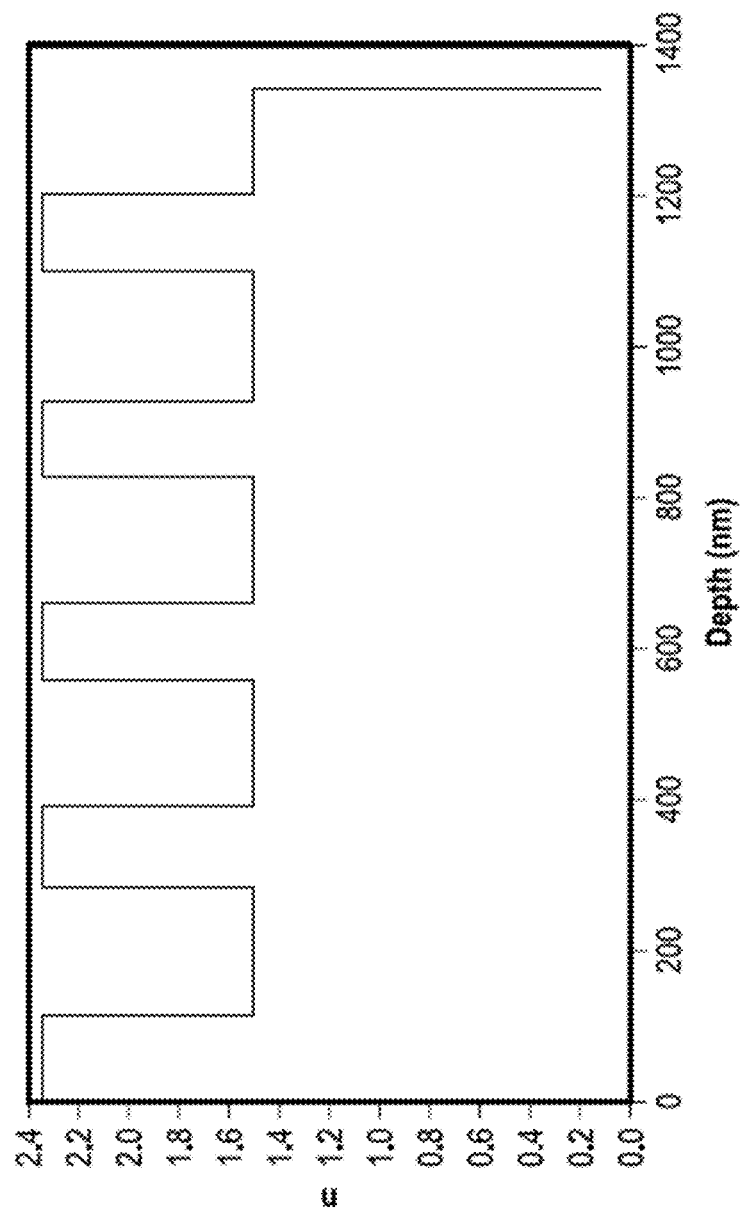
FIG. 3A is the index profile of a composite filter design with $TiO_2$ and $SiO_2$ with nanomesh fabricated according to certain embodiments of the present disclosure.
Figure 3B:
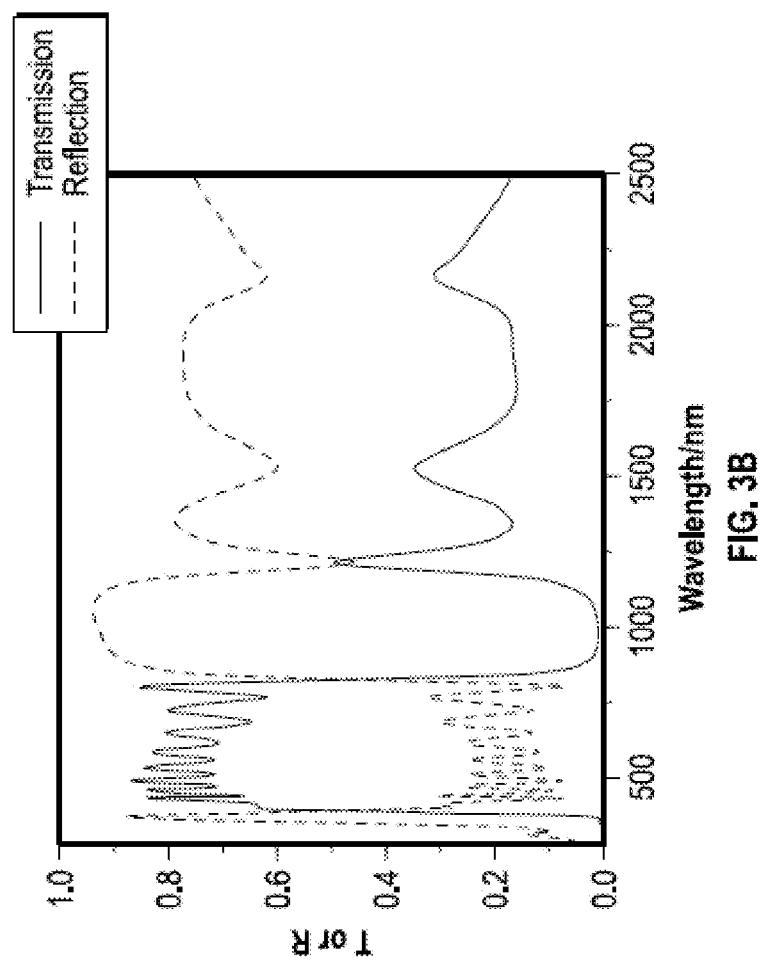
FIG. 3B is a numerical simulation of the transmittance and reflectance of the metal nanomesh composite filter in FIG. 3A.
Figure 3C:
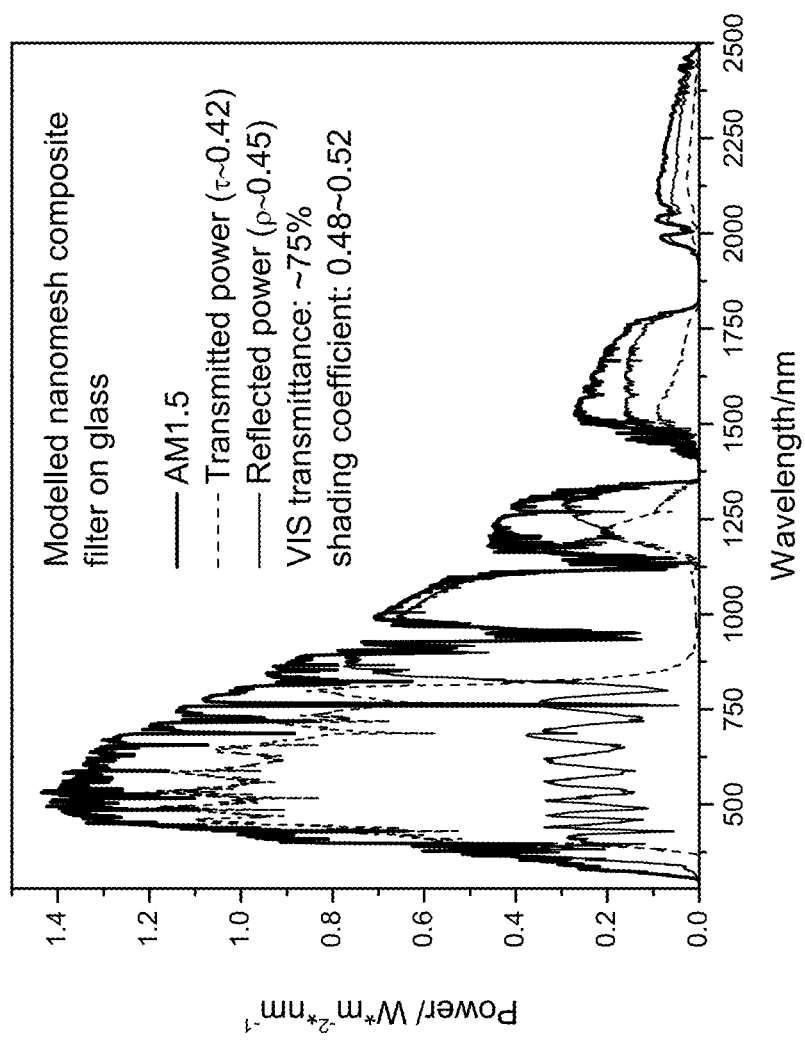
FIG. 3C is a graph of the transmitted and reflected solar energy under AM 1.5 of a nanomesh composite filter on a 3.0 mm silica glass with ~75% VIS transmittance fabricated according to certain embodiments of the present disclosure.

In a first embodiment, a first NCF is fabricated using alternating dielectric materials plus a single layer of nanomesh. In this design, the coating consists of metallic nanomeshes and dielectric protection layers. The IR reflection is realized mainly by the reflection of metal nanomeshes of the wavelengths larger than the mesh size and the dielectric covering layers also help. FIG. 3A is a graph of the refractive index profile of an NCF fabricated using alternating compositions of dielectric layers and at least one nanomesh layer disposed on at least one end of the stacked, alternating dielectric layers. FIG. 3A shows the refractive index profile of 11 layers that is based on alternating TiO2 and SiO2 dielectric layers plus a single layer of the nanomesh under a Lorentz-Drude model. In an embodiment, the thicknesses of the layers from the glass side are shown as followed: 112 nm $TiO_2$; 170 nm $SiO_2$; 104 nm $TiO_2$; 168 nm $SiO_2$; 103 nm $TiO_2$; 165 nm $SiO_2$; 103 nm $TiO_2$; 168 nm $SiO_2$; 105 nm $TiO_2$; 139 nm $SiO_2$; 8 nm effective model (nanomesh). FIG. 3B illustrates the visible-light transmittance of an NCF fabricated using alternating compositions of dielectric layers and at least one nanomesh layer disposed on at least one end of the stacked, alternating dielectric layers, similar to the embodiment in FIG. 6. Visible-light transmittance: Numerical simulation shows that the nanomesh composite filter based on similar nanomeshes and certain dielectric materials on a piece of 3.0 mm silica glass can exhibit high transmittance (80%) from 400 to 780 nm but low transmittance in the range beyond 800 nm. FIG. 3C is a graph of the transmitted and reflected solar energy under AM 1.5 of a nanomesh composite filter on a 3.0 mm silica glass with ~75% VIS transmittance.

Figure 4A:
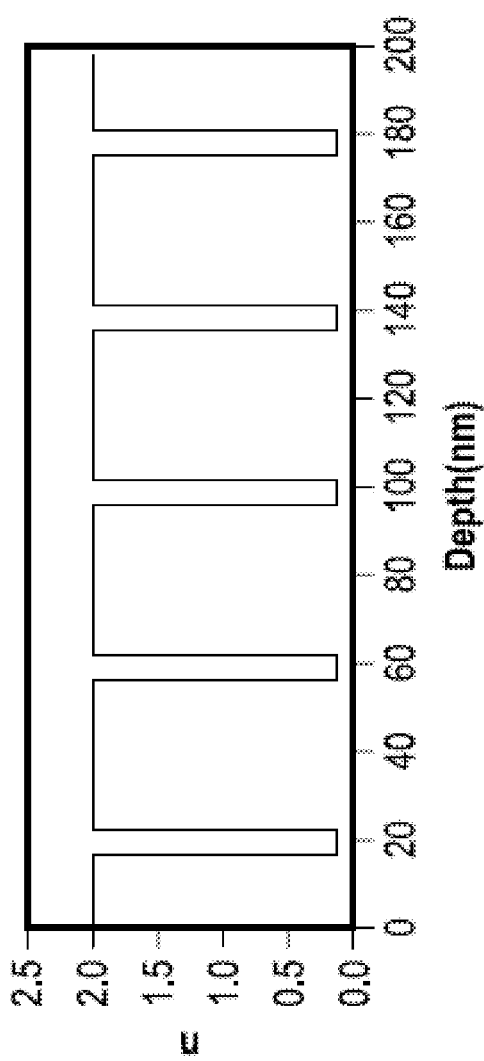
FIG. 4A is an index profile of a metal nanomesh composite filter design comprising alternating layers of ZnO and the effective model (nanomesh) fabricated according to certain embodiments of the present disclosure.

In a second embodiment, the NCF is comprised of alternating dielectric and nanomesh layers. FIG. 4A is a graph of the refractive index profile of an NCF fabricated using alternating layers of at least one composition of dielectric and at least one composition of nanomesh. FIG. 4A shows the refractive index profile of 11 layers that is based on alternating ZnO and the nanomesh model. The first and last ZnO layers are 17 nm thick and all other ZnO layers are 34 nm thick. All effective model (nanomesh) layers are 5.5 nm. While a single composition of dielectric layer is discussed in this embodiment, in other embodiments there may be different compositions of dielectric layers used in an alternating fashion with the nanomesh layers, and the nanomesh layers may comprise different compositions or the same composition, depending upon the embodiment and end applications and desired properties.

Figure 4B:
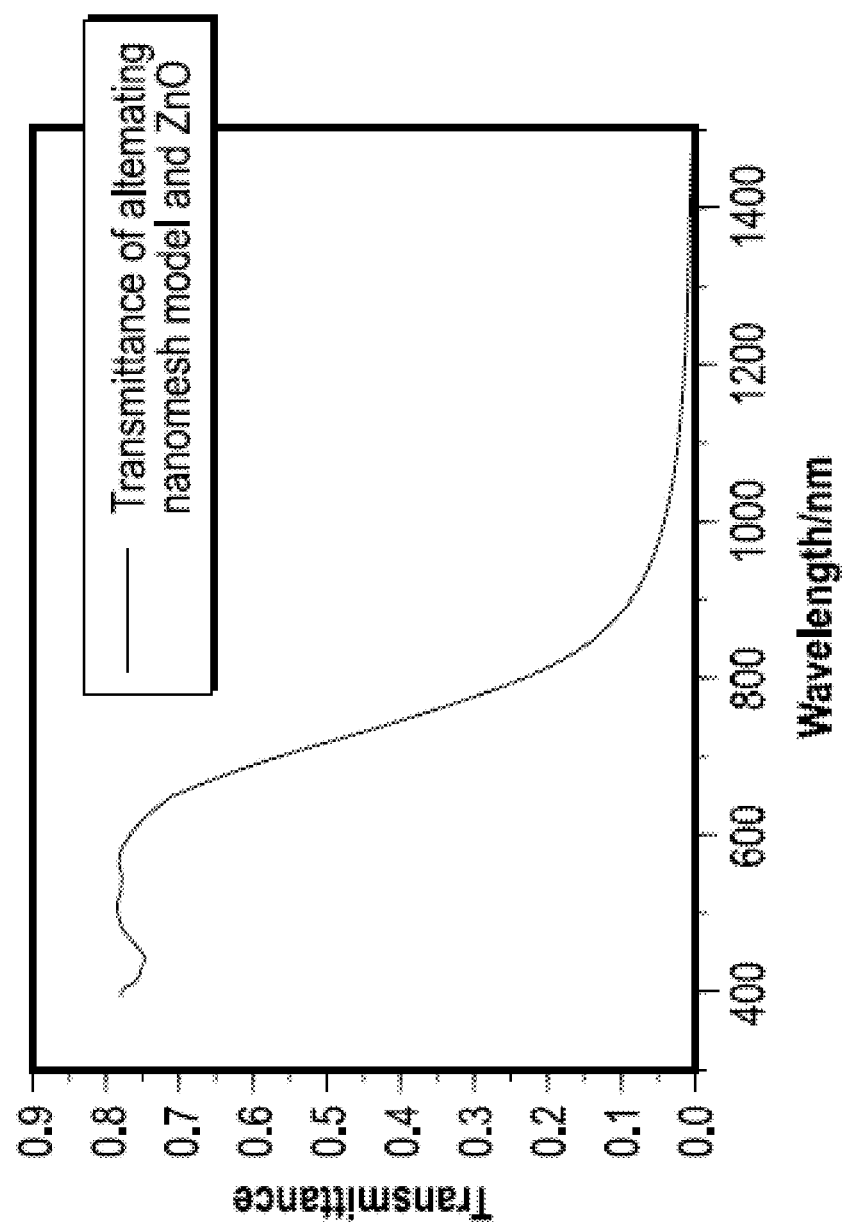
FIG. 4B is a numerical simulation of the transmittance and reflectance of the metal nanomesh composite filter in FIG. 4A.

FIG. 4B illustrates the visible-light transmittance of an NCF fabricated using alternating layers of at least one composition of dielectric and at least one composition of nanomesh. The NCF exhibited high transmittance (about 80%) from about 450 nm to about 620 nm, but low transmittance in the range beyond about 800 nm.

Figure 5:
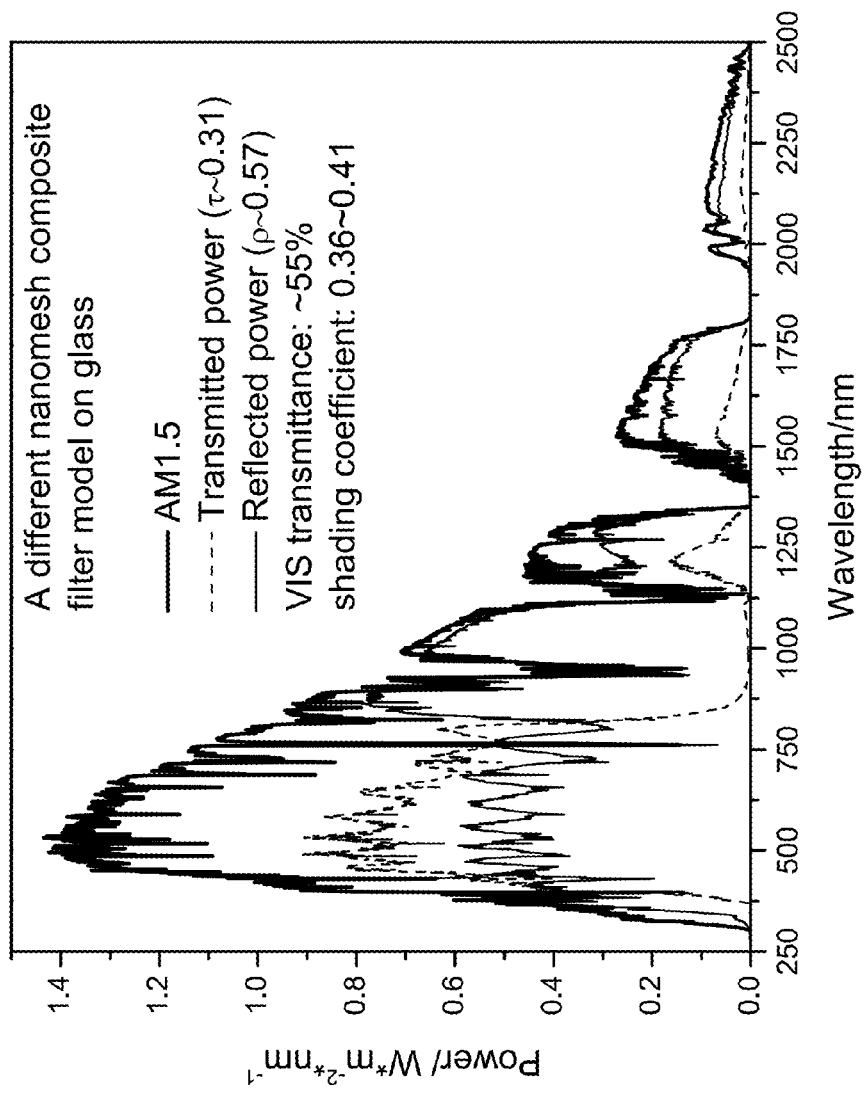
FIG. 5 illustrates the transmitted and reflected solar energy under AM 1.5 of a nanomesh composite filter fabricated according to certain embodiments of the present disclosure.

FIG. 5 illustrates a simulated trading coefficient according to the simulated transmission and reflection spectra, the transmitted and reflected power spectra of the composites under solar irradiance can be calculated as shown in FIG. 5. It can be seen that the solar transmission factor r is about 0.42 and the solar reflection factor p is 0.45. Due to the existence of metal nanomeshes, the outside surface heat transfer coefficient $h_o$ is expected to be higher, or possibly orders of magnitude higher, than the inside surface heat transfer coefficient $h_i$. Thus $h_i/(h_i+h_o)$ can be 0~0.3 (if the air flow near the windows is by natural convection). The shading coefficient S.C. can then be estimated using $$S.C.=(r+(1-r-p)*h_i/(h_i+h_o))/0.87$$

to be between 0.48 and 0.52. An unoptimized model using nanomeshes with higher reflectance indicates that a potential filter with about 55% VIS transmittance and about 0.4 S.C. can be achieved, as shown in FIG. 5 FIG. 5 illustrates the transmitted and reflected solar energy under AM 1.5 of a nanomesh composite filter with a thicker effective thickness than the sample in FIG. 3A.

Thermal stability: The metal nanomeshes are highly stable. For example, the Au nanomeshes are proved to survive 500° C. Such a good thermal stability allows for good life time of the filters under sunlight illumination. In the first design, by changing the thickness of the effective model, the overall properties of the filter can be changed, as shown in FIG. 5, which has a thicker layer of the nanomesh was utilized.

Fabrication of Nanomesh

Generally, a flexible transparent metal nanomesh is a continuous metal network on the nanoscale. The metallic network retains high electric conductivity and transparency under large deformations arising from stress or bending. Disclosed herein are a flexible transparent metallic nanomesh and a manufacturing method therefor.

Generally, a disclosed method comprises a metal oxide/oxide bilayer lift-off metallization followed by wedging transfer. The nanomesh is fabricated by a non-lithographic bilayer lift-off metallization process, in which the mask layer originates from a self-assembled metallic indium (In) film. Such method is configurable to permit control and tuning of the nanowire width, mesh size, and thickness of the nanomesh. In some configurations, the metal nanomesh may be supported on silicon substrate to facilitate aqueous floating and intact transfer to another substrate. In certain instances, the substrate may comprise a hydrophobic or hydrophilic substrate, without limitation.

Structure:

Referring now to FIG. 10 there is illustrated and described herein a metallic nanomesh with a high transmittance and low resistance. In instances, the metal comprises aluminum (Al), copper (Cu), gold (Au), silver (Ag), platinum (Pt), palladium (Pd), and the alloys, and combinations thereof. In exemplary configurations disclosed herein, the metals comprise gold (Au), silver (Ag), platinum (Pt), and the alloys thereof.

In the nanomesh of the various embodiments, the nanowires comprise a thickness or diameter of the wires between about 10 nm and about 500 nm, or alternatively, between about 20 nm and about 200 nm. In certain exemplary configurations, the nanowires have a thickness of between about 50 nm and 100 nm. Further, the nanomesh formed by the nanowires includes holes that have a size or diameter of between about 0.1 µm and about 10 µm; or alternatively, between about 0.2 µm and about 9 µm; and in exemplary configurations, between about 0.4 µm and about 1.0 µm. As used herein, a nanomesh's "mesh size" is defined by the hole or aperture size in the mesh, such that a nanomesh having a mesh size of between about 0.4 µm and about 1.0 µm, for example, means the nanomesh has holes or apertures of that size. Without limitation by theory, the dimensions of the nanomesh may be at least partially determined by the metal of the nanowires.

Further, the nanomesh of the present disclosure is configured for transmittance in the ultraviolet to infrared spectrum, including the visible spectrum. For example, the nanomesh is configured for transmittance between about 200 nm and about 1500 nm, alternatively, between about 300 nm and about 1400 nm, and in exemplary configurations between about 400 nm and about 1000 nm. Generally, the nanomesh is configured for a transmittance of at least about 40%; alternatively a transmittance of at least about 50%, and in exemplary configurations a transmittance of at least about 60% within this spectrum. Further, in some instances, the transmittance is tunable dependent on the metal or semi metal used, the nanowire thickness, and the mesh size, such that in certain applications the transmittance is between about 50% and about 95%, and alternatively between about 60% and about 95%.

The nanomesh of certain embodiments is further configured to have a flexibility based on the ratio of the stretched or strained dimension relative to the initial dimension before the nanomesh is subjected to the stretching or staining. Resistance change at strained states is used to characterize the flexibility. Alternatively, the flexibility of the nanomesh may be measured by the percent strain. In general, the nanomesh configured according to the present disclosure comprises a flexibility of at least about 100% strain; alternatively, at least about 125% strain, and in exemplary configurations, at least about 150% strain. Without limitation by theory, in certain configurations, by altering the metal or semi metal used, the nanowire thickness, and the mesh size, a nanomesh formed according to the present disclosure may have a strain of at least about 200%.

The nanomesh of certain embodiments comprises long metal nanowires that are connected with low contact-junction resistance. Thus, the nanomesh maintains a high conductivity evidenced by low sheet-resistance, wherein sheet resistance is defined by Ohms per square area ($\Omega/\square$). In instances, the nanomesh of the present disclosure has a sheet resistance that is less than about $30\Omega/\square$; alternatively, less than about $20\Omega/\square$; and in certain configurations the sheet resistance is less than about $10\Omega/\square$. Without limitation by theory, in certain configurations, by altering the metal or semi metal used, the nanowire thickness, and the mesh size, a nanomesh formed according to the present disclosure may have a sheet resistance that is less than about 5 $\Omega/\square$.

Method:

Referring now to FIG. 10, there is illustrated a method 100 for fabricating a nanomesh. Generally, method 100 utilizes the concepts of grain boundary lithography for making semi-metal or metallic nanomeshes. Further, the nanomeshes are transferred in method 100 to a substrate by floatation and contact transfer. More specifically, the method 100 comprises depositing 110 a sacrificial film 15 on a substrate 10, depositing 115 a first metal 20 overlayer, etching 130 the sacrificial film 15, oxidizing 140 the first metal overlayer 20, etching 150 the sacrificial film 15, depositing 160 a second metal 30, and removing 170 the sacrificial film 15. In instances, the nanomesh 40 remains on the substrate 10. The nanomesh 40 comprises a network of connected nanowires 45 having a thickness T, a line width L, and mesh size M.

Referring now to FIG. 11, there is illustrated a method 200 for transferring a nanomesh. Generally, the method 200 comprises floating 210 the nanomesh 40 on an aqueous solution 70, stabilizing 220 the nanomesh on the surface of the aqueous solution, contacting 230 the nanomesh 40 with a substrate 60, and lifting 240 the nanomesh 40 off the solution.

Referring again to FIG. 10, the method comprises depositing 110 a sacrificial layer on the substrate. Generally, the substrate 10 itself comprises a non-metal element, for example silicon. In instances, depositing 110 an etchable layer 15 comprises depositing a non-metal, a semi-metallic or metallic element on the substrate. Further, the etchable layer 15 comprises an oxide of the non-metal, semi-metal, or metal element. In exemplary instances, the etchable layer 15 comprises silicon oxide ($SiO_x$). Depositing 110 the sacrificial layer 15 may be done by any method, including but not limited to chemical-vapor-deposition, sputtering, thermal sublimation, and combinations thereof. In exemplary steps, the depositing the sacrificial layer 110 comprises sputtering. In some configurations, the sacrificial layer 15 comprises an oxide layer.

The method 100 comprises depositing 120 a first metal 20 on the etchable layer 15. Without limitation, the first metal 20 is a metal or semi-metal element. Depositing 120 the first metal 20 comprises leaving cracks or gaps 25 in the first metal 20. Without limitation by any particular theory, solid metal forms crystals or grains having ordered layers of metal or semi-metallic atoms. The conditions and rate of deposition, generally determine the grain size of a metal. Thus, it may be understood that the gaps 25 in the first metal 20 are spatially arranged based on and around the perimeter of the first metal grains. The first metal 20 comprises any metal or semi-metal element having a grain size that is size or diameter between about 0.1 μm and about 10 μm; alternatively the grain size is between about 0.2 μm and about 1 μm; and in exemplary configurations between about 0.4 μm and about 0.8 μm. Depositing 120 the first metal 20, further comprises any method of depositing a metal or semi-metal element, including without limitation sputtering, chemical vapor deposition, or electron-beam evaporation.

Etching 130 the film 15 comprises removing the film 15 from the substrate 10. Generally, the first metal 20 acts as a mask after the etching 130 step and subsequent oxiding 140. The gaps 25 that do not cover the sacrificial film 15 permit the removal of the film 15 from the substrate 10. In instances, etching 130 the film comprises washing the film in an ionic and oxidizing solution. Generally, the ionic solution comprises an aqueous ionic solution, for example an acidic solution. In exemplary instances, the aqueous acid solution is selected from those capable of etching or removing a metallic-oxide or semi-metallic oxide from a substrate 10. Further, the aqueous acid solution comprises nitric acid ($HNO_3$) in certain instances. Without limitation by theory, etching 130 the film further comprises controlling the width of the gap 25.

The method 100 comprises the step of oxidizing 140 the overlayer. Generally, the overlayer is the first metal layer 20. Generally, oxidizing 140 the first metal layer 20 comprises exposing the first layer to an oxidant, for example oxygen. In some configurations, oxidizing 140 the first metal layer 20 comprises annealing in air or other oxidant, or altering the temperature. Alternatively, oxidizing 140 the first metal layer 20 comprises washing the deposited layers in an ionic solution, for example an acid. In exemplary instances, oxidizing the first metal layer comprises a combination of washing the first metal layer with an oxidant and thermal oxidation. Without limitation by theory, oxidizing 140 the first metal layer 20 comprises increasing the size of the gaps 25 between metal grains by at least partially degrading the outer layer of metal atoms in each grain. Further, oxidizing 140 the first metal layer 20 comprises forming a mask. Etching sacrificial film 150 comprises of rinsing in etchant, leading to the formation of undercuts. The metal oxide film from the first metal 20 acts as the mask layer to protect the sacrificial layer, whereas the uncovered parts, the gaps 25, are etched. Without limitation by theory, etching 150 the film further comprises undercutting the oxide mask layer transformed from oxidizing 140 the first metal film.

Depositing 160 a second metal 30, comprises depositing the nanowires 45 that form the nanomesh 40. As described hereinabove, depositing 160 a second metal 30 may be achieved by any method and in certain instances, the method comprises electron beam evaporation, or thermal evaporation. In instances, depositing 160 the second metal comprises depositing at least one of the elements of aluminum (Al), copper (Cu), gold (Au), silver (Ag), platinum (Pt), palladium (Pd), and the alloys, and combinations thereof. In exemplary configurations disclosed herein, the metals comprise gold (Au), silver (Ag), and the alloys thereof.

In order to leave the nanowires 45 behind forming the nanomesh 40, removing 170 the second metal comprises removing 170 the mask of the second metal 30 and the sacrificial film 15 thereunder. In instances, removing 160 the second metal 30 comprises washing the nanowires 40 in an aqueous ionic solution. In certain instances, the aqueous ionic solution is capable of dissolving the sacrificial layer 15, such that the first metal 20 that forms the mask and the second metal 30 dissolve or form a suspension. The aqueous ionic solution generally comprises an acid, such as hydrofluoric (HF) acid as described hereinabove. In some configurations of the present method 200, removing 170 the second metal 30 comprises washing the nanowires 40 with a basic solution. In certain configurations, the basic solution comprises potassium hydroxide (KOH).

Referring again to FIG. 11, floating 210 the nanomesh on an aqueous solution comprises wedging the nanomesh 40 into an aqueous ionic solution. More specifically, wedging the nanomesh 40 into an ionic solution comprises inserting the substrate 10 into the aqueous ionic solution at an acute angle A. Thus, angle B with respect to the surface of the substrate supporting the nanomesh 40 is an obtuse angle. The aqueous ionic solution may be any solution disclosed hereinabove, for example an HF acid solution. In further instances, the ionic solution used for floating 210 the nanomesh may be dilute, for example less than about 5% by volume, alternatively, less than about 3% by volume and in certain instances, about 1% by volume. The lower concentration is desired for less pollution problems.

Stabilizing 220 the nanomesh 40 comprises removing the substrate 10 from the solution and verifying that the nanomesh 40 has not physically deformed. In instances, the nanomesh 40 may wrinkle, bend, fold, or partially submerge in the ionic solution. Stabilizing 220 the nanomesh reduces or eliminates the instances of these configurations. Further, stabilizing the nanomesh may comprise altering surface tension of the solution. Without limitation by theory, changing the surface tension of the ionic solution may permit functionalization or other alteration of the surface characteristics of the nanomesh. In some operations, functionalizing the nanomesh comprises inducing a hydrophilic or hydrophobic affinity to the nanomesh surface.

Subsequently, the method 200 comprises contacting 230 the nanomesh with a substrate, and lifting 240 the nanomesh off the solution. Generally, as shown in FIG. 2c, contacting 230 the nanomesh with a substrate comprises using a planar substrate 60 to at least partially submerge the nanomesh 40. The nanomesh 40 remains in contact the planar substrate 60 through hydrostatic pressure. Alternatively, the nanomesh 40 is hydrophilically or hydrophobically associated with the planar substrate 60. The association of the nanomesh 40 with the planar substrate 60 permits the nanomesh to escape the surface tension of the ionic aqueous solution. Alternatively, in some instances, the substrate 60 is not planar, but rather has a complex three dimensional structure, such that a combination of hydrostatic pressure and the hydrophobic or hydrophilic interactions causes the nanomesh 40 to conform to the substrate's three-dimensional shape.

To further illustrate various exemplary embodiments of the present invention, the following examples are provided.

Examples

Fabrication and transfer of floated Ag nanomeshes: The $SiO_x$ film (65 nm) and In film (about 100 nm) were deposited by using a magnetron sputter, such as the AJA International Inc., ORION-8 magnetron sputtering system, and the Ag films were deposited by using an electron beam evaporation system. The floated metal nanomeshes were made by three steps: (1) rinsing the samples in blended solution of HF (10%) and $H_2O_2$ (0.6%) for 20-40 sec, for example with Ag nanomeshes, or 80 secs, for example for Au nanomeshes, (2) rinsing in 60° C. KOH (2%) solution until the Ag nanomesh goes out and accordingly the sample turns gray, and drying with $N_2$ gas flow, (3) wedging into diluted hydrofluoric acid (HF) (1%) slowly. The metal nanomesh was then transferred to hydrophobic or hydrophilic substrate by slowly pressing the substrate on the floated nanomesh, and after the nanomesh attaching to the substrate it was lifted.

The morphology of the samples was taken by using a scanning electron microscope. Topographic images were taken with an atomic force microscope. Reflectance spectra were recorded with an integrating sphere spectrometer in the wavelength range from 400 to 1000 nm. Sheet resistance was measured by using the van der Pawn method, with four electrodes at four corners of a square of the sample. Stretching experiment was conducted with a home-made setup, and meanwhile the resistance was measured by a two-probe method.

Figures 10A, 10B, 10C, 10D, 10E, 10F:
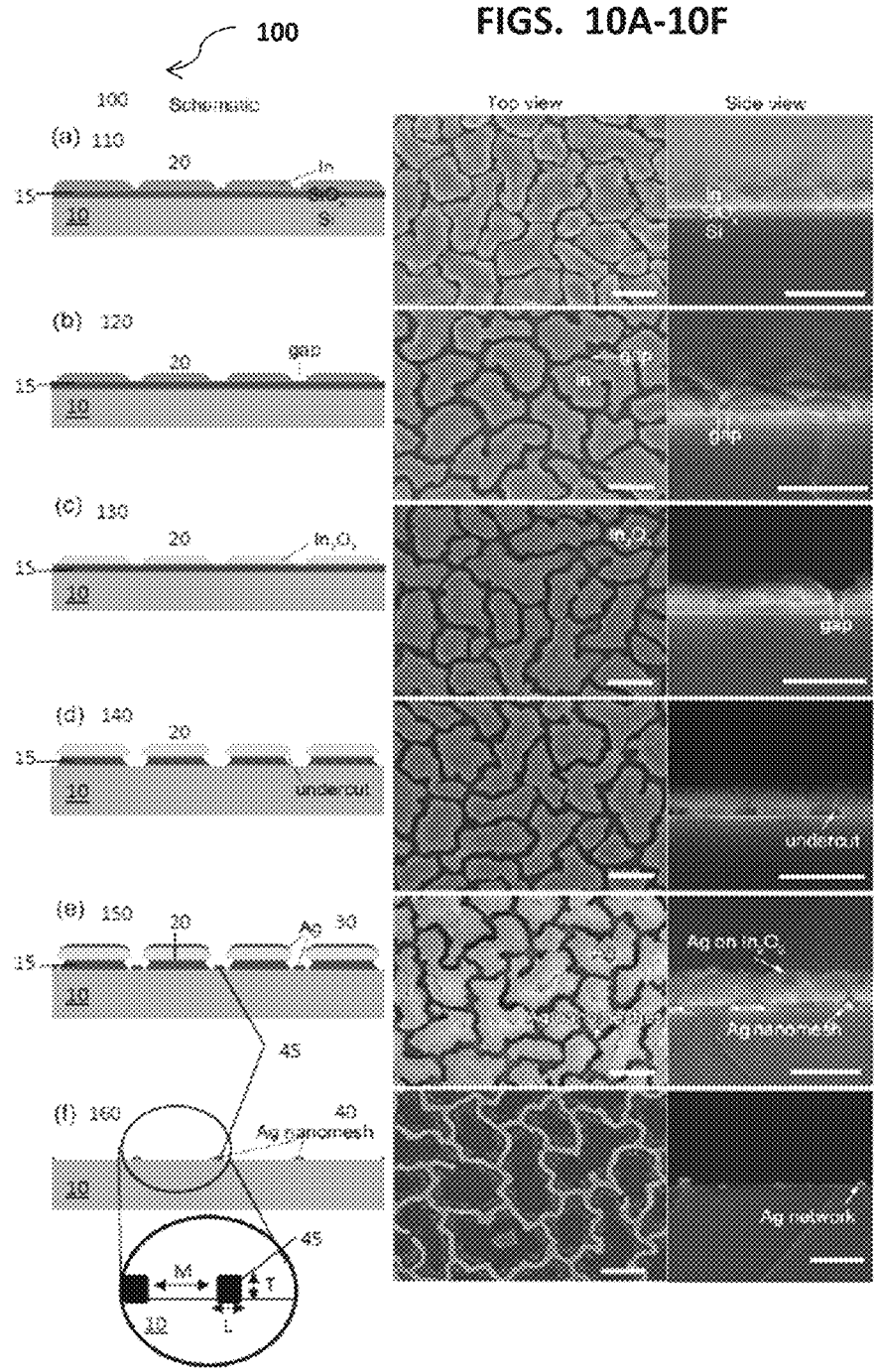
FIGS. 10A-10F schematically illustrate the steps involved in the fabrication of metal nanomeshes with corresponding top and cross-sectional SEM views.

A bilayer lift-off metallization technique offers advantages in resolution, removal, process simplicity, undercut control, and yield over conventional single-layer lift-off process. In this work, the bilayer consists of an $In_2O_3$ mask layer and a $SiO_x$ sacrificial layer for undercut formation. The $In_2O_3$ mask layer is transformed from In film by $HNO_3$ etching and thermal oxidation. The as-deposited In film is made of monolayered In grains, after $HNO_3$ etching a gap is formed with a controllable width between neighboring grains, called islands. FIGS. 10A-10F shows six steps involved in the grain boundary lithography: FIG. 10A illustrates the deposition of a 65 nm thick SiOx sacrificial layer on a Si wafer (resistivity: 5-7 Ω·cm, thickness: 0.5 mm), followed by a 100 nm thick In film. FIG. 10B represents etching the layer in 20 wt. % $HNO_3$ for gap formation, FIG. 10C illustrates the thermal oxidation at 400° C. for 2 h to form $In_2O_3$ islands, FIG. 10D illustrates rinsing in 5 wt. % HF for 12 s, leading to the formation of undercuts, FIG. 10E shows the deposition of a about 30 nm Ag or Au film on top of the HF etched surface, so that a metal nanomesh is formed in the gaps, and FIG. 10F illustrates the lift-off process to dissolve the $SiO_x$ and removal of $In_2O_3$ islands in 5% HF solution to form a metal nanomesh on the substrate.

The middle and right columns in FIG. 10 are scanning electron microscopy (SEM) images, showing top view and cross section view, respectively and corresponding to the steps of FIGS. 10A-10F described in the preceding paragraph. FIG. 10A shows an In/$SiO_x$/Si structure, in which the In film is made of an monolayer of In grains with an average diameter of 650 nm, with quite narrow grain boundaries. FIG. 10B shows the morphology of the film after etching in $HNO_3$ for 16 s. The diluted $HNO_3$ removes all tiny In particles and widens the gaps between large In islands to 60-70 nm, forming an In island film. FIG. 10C demonstrates the morphology of the $In_2O_3$ film by thermal oxidation, with $In_2O_3$ islands taking exactly the same morphology of In islands. With a process of rinsing in HF, undercuts are formed as a result of partial removal of $SiO_x$ (FIG. 10D). By depositing a metal film with a thickness smaller than that of the $SiO_x$ layer, a metal nanomesh is formed in the grooves. The undercuts can guarantee the formation of metal nanomesh in the grooves, and the configuration of the nanomesh is defined by the gaps (FIG. 10E). The last step is a lift-off process under ultra-sonication for tens of seconds, during which $SiO_x$ and $In_2O_3$ islands are removed, leaving a metal nanomesh on the substrate. In the last step, the sample should be well shaken so that liquid flow could take away all $In_2O_3$ islands.

Line width, mesh size, and thickness of the metal nanomesh can be controlled. The line width is defined by the gap resultant from etching of the first metal; in certain instances, it may be considered the thickness of the nanowires. The gap formation in diluted $HNO_3$ involves two processes, the surface oxidation (passivation) of In islands and acidic etching of the oxide skin, expressed as:

$$2In+2HNO_3 \rightarrow In_2O_3+2NO\uparrow+H_2O \qquad (1)$$

$$In_2O_3+6H^+ \rightarrow 3H_2O+2In^{3+} \qquad (2)$$

If the etching process does not involve oxidation, then metallic In will be directly etched by H+. Owing to the fact that etching rates differ for different facets, the gap width will therefore not be homogeneous. And this process will be very fast. Alternatively, an oxide skin could lead to isotropic etching that is similar to the isotropic etching of single crystalline Si wafer in HNA solution (blended solution of HF, $HNO_3$, and $CH_3COOH$, in which $HNO_3$ is the oxidant). The surface oxidation greatly decreases the etching rate to a controllable level. In comparison, 4 mol·$L^{-1}$ HCl solution (a non-oxidizing acid whose concentration of $H^+$ is close to that of the $HNO_3$ solution that was used) could dissolve the In film in a very short time, such as one second. Note that the oxide skin is dynamically formed so that there is always an oxide layer on the In islands. The oxidation-acidic etching process makes the gap width quite homogeneous and well controllable.

FIGS. 14A-14C illustrate the process of etching 130, including surface oxidation (or passivation) and acidic etching. The gap width (w) is shown to increase linearly with the increasing of etching time (t). FIG. 14D plots the dependence of gap width on etching time in conditions where, in this case, 20 wt. % $HNO_3$ at room temperature, showing that w is linear to t. After thermal oxidation at 400° C. for hours, the gap width is almost unchanged, due to that the expansion of the islands is confined by the underlying $SiO_x$.

The lateral isotropic etching from a grain boundary offers controllability over the width of nanowires, and the mechanism is much different from main stream nanofabrication techniques. For example, for direct writing techniques including electron beam lithography, focused ion beam milling, and laser direct writing, the feature size of the fabricated metal nanowires is mainly determined by the spot size of energy beam; and for nano-imprinting lithography, size of the template defines the feature size of the fabricated structures. $H^+$ ions were applied to laterally etch the surface-oxidized In islands from the boundary, leading to controllable gaps whose width can be tuned on a molecule scale. Moreover, the etching process of a wafer scale sample can be finished in tens of seconds, quite suitable for mass production.

Apart from the width, mesh size (M), which equals to the size of In islands, is another important parameter. The island size is found to be linear to the thickness (or deposition time) of the In films, with an empirical relationship of M=7 h nm, where h is the film thickness (when h is in the range from 50 nm to 500 nm). Besides, the thickness of the metal nanomeshes can also be controlled by varying the metal film thickness. Therefore, line width, mesh size, and thickness of the metal nanomeshes are all well controllable.

Figures 11A, 11B, 11C, 11D, 11E:
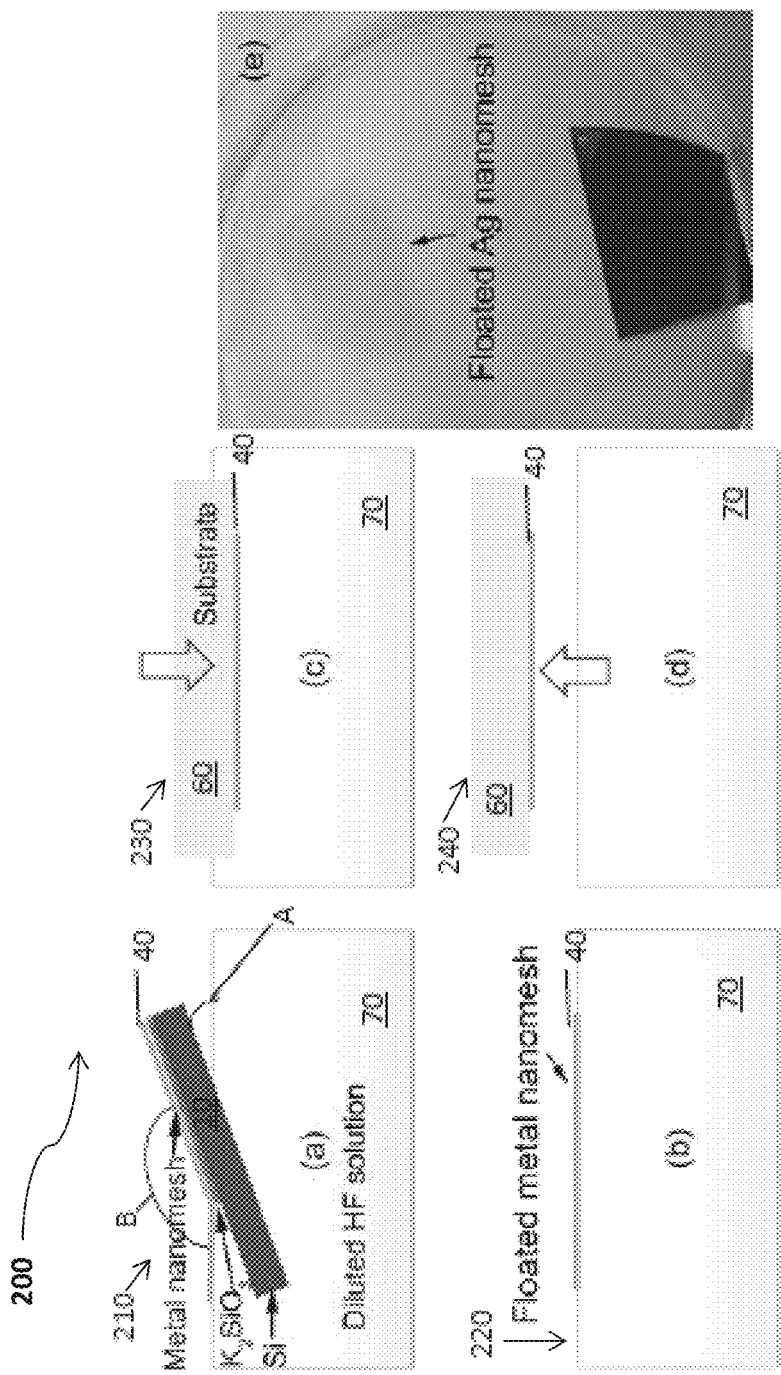
FIGS. 11A-11E schematically illustrate transferring of a metal nanomesh to a substrate and a photograph of a floating nanomesh according to certain embodiments of the present invention.

In order to completely remove the $In_2O_3$ grains and protect the metal mesh, catalytic etching was used, during which the metal nanomesh embeds into Si wafer with a depth of several hundred nanometers, and then the $In_2O_3$ grains are removed in water with a lens paper. Metal nanomeshes on or embedded in silicon wafer, however, are difficult to be directly transferred to other substrates because of the good adhesion of the metal/Si interface. A dissolvable layer inserted in the metal mesh and Si substrate solves this problem. The sample was rinsed in hot diluted KOH solution (wt. 2%) to introduce a $K_2SiO_3$ layer, and then slowly wedge the sample into diluted HF solution (wt. 1%) with an incidence angle of about 30° (FIG. 11A). As the $K_2SiO_3$ layer gets dissolved in HF, the metal nanomesh is pushed away from the hydrophobic Si surface, and as a result it floats on the solution (FIGS. 11B and 11E). An optimized route is that before the nanomesh is completely released, the sample is slowly lifted and inserted again into deionized water to avoid introducing too much HF. It should be noted that after rinsing in KOH, the samples must be dried or else the nanomeshes will not float on water. This is because only dried nanomesh can be pushed away from the wafer by the surface tension of water.

The metal nanomeshes do not sink in water, and they float on water even without any folds or wrinkles. Although Ag and Au are hydrophilic, water could not penetrate nanomeshes of Ag or Au because surface tension of water can support the meshes (similarly, even a small paper clip made of metal can float on water). Moreover, a component of surface tension of water pulls normally and horizontally to each nanowire. And at a macro-level, this force is outward and perpendicular to the edges of a nanomesh and therefore keeps the nanomesh unfolded.

The wedging transfer of nanomeshes was accomplished by placing a substrate on the bottom of a beaker and pumped down water, and a probe was used to control the position of floated structure for alignment. Disadvantages of this method include two aspects: it has to drain water (this is troublesome and is not applicable for light substrates with a density less than that of water); and it is also not applicable to hydrophobic substrates because water will destroy the metal nanomesh. But for flexible photo-electronics, the substrates are often hydrophobic and light organic materials. Even for a hydrophilic substrate, there will also be a water membrane between metal nanomesh and the substrate, and it might lead to the formation of wrinkles or folds during drying (graphene flakes transferred by this method often have wrinkles.) To avoid damage or deformation, the substrate should not contact water, so the the substrate must be placed on the metal nanomesh from the air side (FIGS. 11C and 11D). The experimental results indicating that this simple method is more effective, and it is able to transfer metal nanomeshes onto hydrophobic or hydrophilic substrate (exemplified by PDMS and metal, respectively) without any damage or even deformation. The result indicates that for wedging transfer, introducing water between substrate and floated nanostructures should be avoided.

The Ag and Au nanomesh have excellent electrical conductivity. For a 40 nm thick silver nanomesh with a mesh size of about 700 nm and a line width of about 90 nm processed on a 1 cm×1 cm silicon wafer, the sheet resistance is about 7Ω/□. This is lower than that of conventional carbon nanotube- and graphene-based transparent electrodes, commercial ITO films, and conventional solution processed Ag nanomeshes. The low resistance may be related to the absence of high resistance "junctions", which is a problem for solution-processed Ag nanomeshes. The disclosed Au nanomeshes demonstrate a slightly higher sheet resistance but when optimized 10Ω/□ is achievable, more than one order lower than that of conventional solution processed Au nanomeshes (>400 6Ω/□). Typically, the Au nanomeshes having a mesh size of 1 μm, thickness of 35 nm, and wire-width of 70 nm demonstrate a sheet resistance of 20-30Ω/□. It is worth noting that the electrical conductivity of the nanomeshes can be well tuned by simply varying gap widths between $In_2O_3$ islands and/or metal film thickness. For example, Ag nanomesh samples with a thickness of 45 nm, keeping other parameters the same, present an even lower sheet resistance of about 6 Ω/□.

Figures 12A, 12B, 12C, 12D:
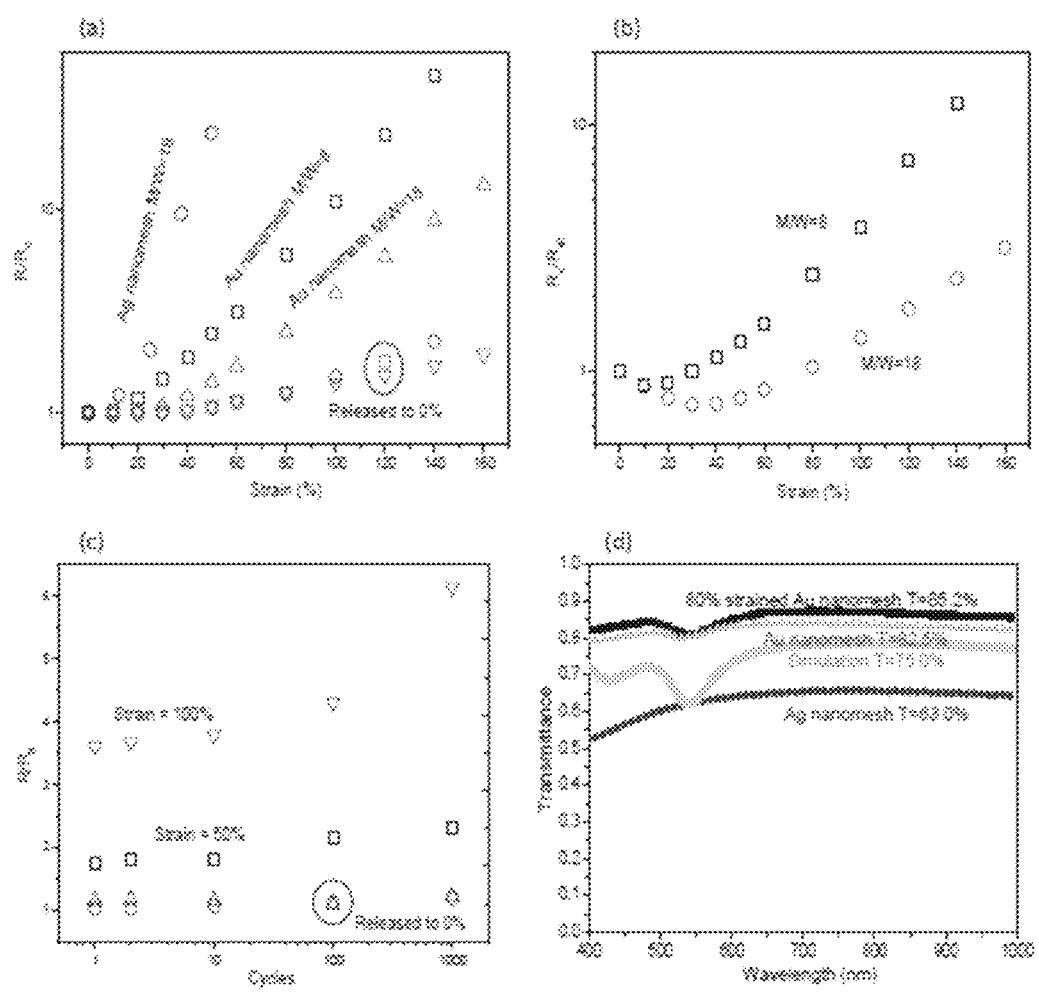
FIGS. 12A-12D are graphs illustrating a plurality of properties of nanomesh structures fabricated according to embodiments of the present disclosure.

Although the Au nanomesh has a slightly lower electrical conductivity compared to the Ag nanomesh, it is a much better flexible transparent electrode. Au is a metal with excellent ductility, and has demonstrated the desired flexibility of Au nanowires. FIG. 12A plots the dependences of resistance change ($R/R_0$, where R and $R_0$ are sheet resistances of stretched and non-stretched nanomeshes, respectively) on tensile strain (ε) for Ag and Au nanomeshes supported on PDMS substrate (about 1 mm thick). $R/R_0$ of the Ag nanomesh is quite close to 1 at a strain of 12.5%, but it goes to 24 as ε increases to 50%, and sharply to 870 when ε increases further to 62.5%. This is already too high for many applications. In contrast, $R/R_0$ of the Au nanomesh is only about 3.8 at a strain of 100%, and it increases to 13.3 at an ultra-high strain of 160%, at which the PDMS substrate fractures. This result is even better than that of the Ag nanomesh made of "very long Ag nanowires". The sheet resistance (Rs) of the stretched Au nanomesh, is even smaller than the original sheet resistance ($Rs_0$) until it is stretched to 80% strain or larger. This means the Au nanomesh is even "more conductive" at relatively low strains. And $Rs/R_{s0}$ is only 3.2 as strain goes to 160%. The mesh-size to line width (M/W) ratio could affect the flexibility of the Au nanomeshes. FIGS. 12A and 12B shows performance data of two Au nanomeshes with M/W of 18 and 8, respectively. The sample with larger M/W presents much lower $R/R_0$ and $R_s/R_{s0}$ values (it also has better transmittance of 82.5% but higher sheet resistance of 25Ω/□, compared to 70% transmittance and 15Ω/□ sheet resistance for the sample with a lower M/W). $R/R_0$ returns to a lower value of less than 2 after releasing, probably because of the re-contact and cold welding of fractured nanowire where necking happened. This is evidenced by the fact that it takes time for the release R to drop to the minimum and get stabilized. Au could not be oxidized in air so that no oxide skin will be formed, and this makes cold welding possible. The low released R is significant because it means even when the Au nanomesh is over-stretched, it can still be partially recovered.

The Au nanomesh also shows better transmittance than the Ag nanomesh. FIG. 12S is a plot of the transmittance spectra of the Au and Ag nanomesh samples. The Au nanomesh presents a high transmittance of 82.5%, contrasted with 63.0% for the Ag nanomesh (both with a sheet resistance of about 20Ω/□). It should be noted that the data shown here are specular transmittances, or the transmittances emergent from the nanomesh and parallel to the beam entering the nanomesh, and thus do not include scattered transmission portion. For Ag nanomeshes made of conventional solution processed nanowires, scattered transmission is often well more than 10%, that means even the total transmittance achieves 90%, the specular transmission should be lower than 80%. In comparison, dispersed transmission for Au nanomesh is only about 3% (when transmittance exceeds 80%), this may allow its applications in displays or other fields where scattered light is undesired. The stretched Au nanomesh was observed to have a higher transmittance (85.2%) at a strain of about 80%). Note that under a strain of 80%, both sheet resistance and transmittance are improved. The higher transmittance of Au nanomesh is related to its low reflectance. A comparison between Au and Ag nanomeshes shows that the reflectance are 5.5% and 14.2%, respectively, measured by an integrating sphere detector. The higher reflectance of the Ag nanomesh is foreseeable because Ag is an excellent reflector that has been widely used for mirrors.

Figures 13A, 13B, 13C:
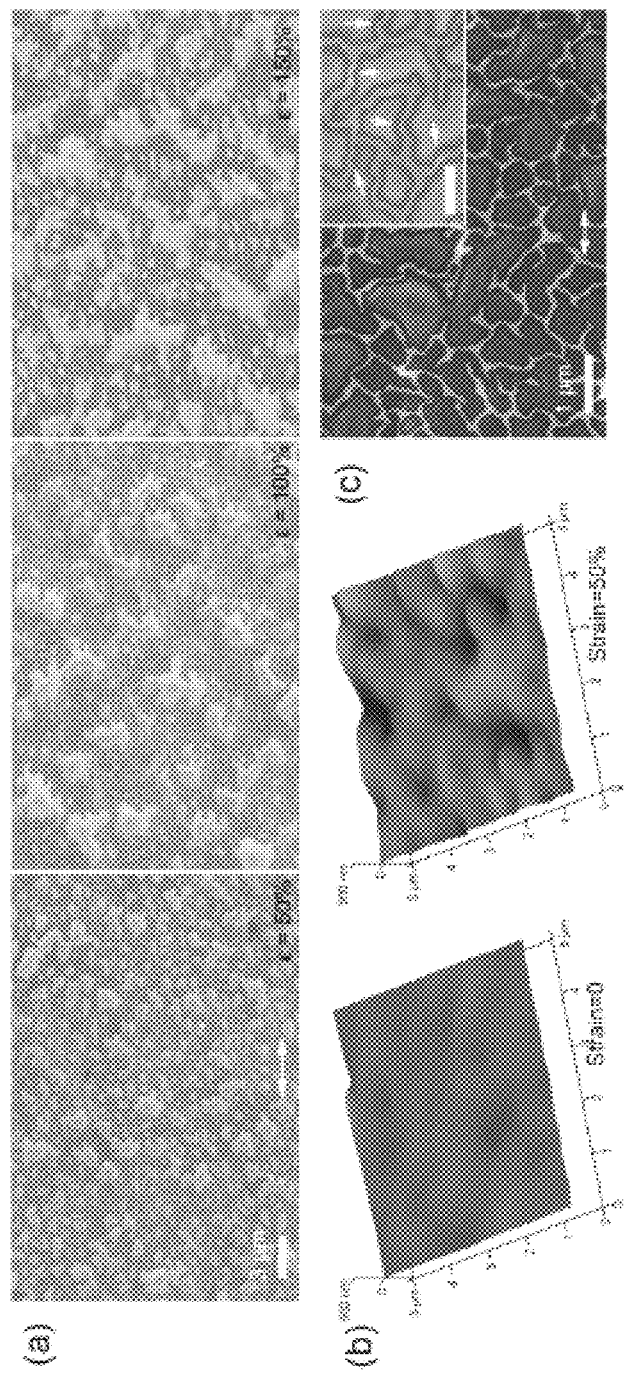
FIG. 13A illustrates a scanning electron microscopy (SEM) micrographs of the morphology of stretched Au nanomeshes on PDMS substrate with tensile strains of 50%, 100%, and 150%, respectively fabricated according to certain embodiments of the present disclosure.
FIG. 13B are atomic force microscopy (AFM) images of non-stretched Au nanomesh 0%, and stretched Au nanomesh with a tensile strain of 50% supported on PDMS fabricated according to certain embodiments of the present disclosure.
FIG. 13C is a scanning electron microscopy (SEM) micrographic image of the stretched Au nanomesh showing necking of the Au nanowires fabricated according to certain embodiments of the present disclosure.
Figure 15:
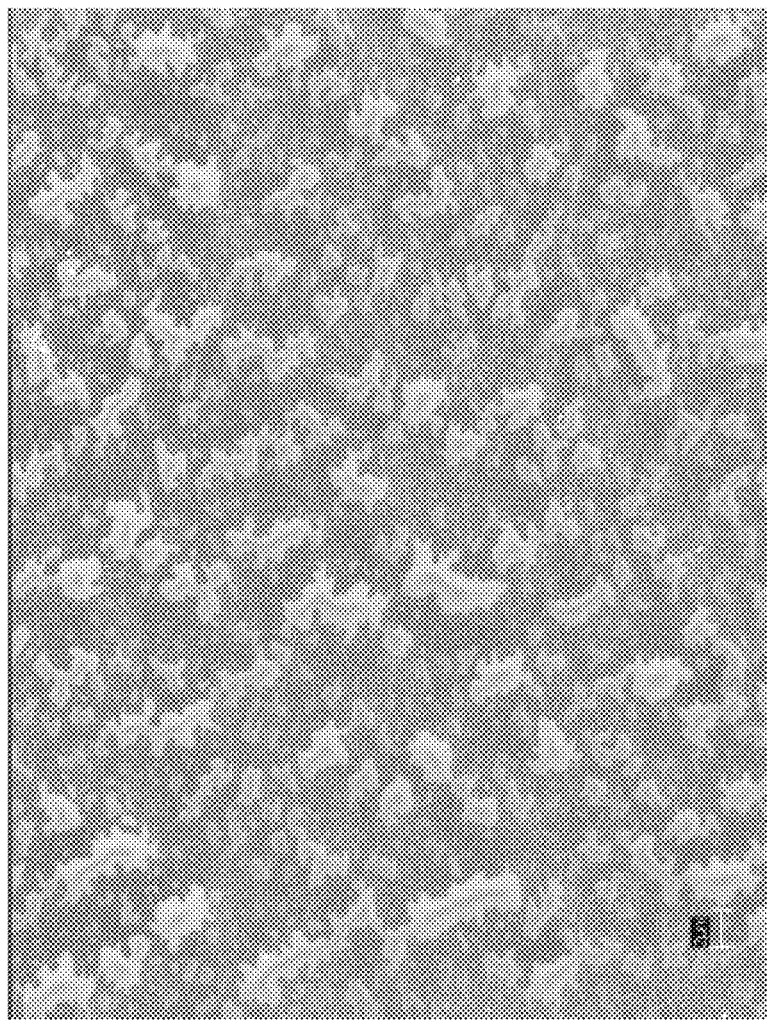
FIG. 15. illustrates an SEM image of stretched Au nanomesh, showing cracks which are formed during stretching. These cracks divide the Au nanomesh into a larger mesh.

The nanomesh could be regarded as randomly woven metallic serpentines. FIG. 13A illustrates a scanning electron microscopy (SEM) micrographs of the morphology of stretched Au nanomeshes on PDMS substrate with tensile strains of 50%, 100%, and 150%, respectively fabricated according to certain embodiments of the present disclosure.

FIG. 13B are atomic force microscopy (AFM) images of non-stretched Au nanomesh 0%, and stretched Au nanomesh with a tensile strain of 50% supported on PDMS fabricated according to certain embodiments of the present disclosure.

FIG. 13C is a scanning electron microscopy (SEM) micrographic image of the stretched Au nanomesh showing necking of the Au nanowires fabricated according to certain embodiments of the present disclosure. According to some simulations, stretched one dimensional serpentines on a quite soft substrate, could have both in plane and out of plane deformations, which is also experimentally seen in the two dimensional case as in AFM images FIG. 13B. This shows that further stretching could lead to cracks oriented perpendicularly to the external load, thus forming a hierarchical network as in FIG. 15. The cracks get longer and wider with the increasing of strain, thus resistance gradually increases.

The excellent flexibility and good transmittance of the Au nanomesh makes it very suitable as a transparent electrode for flexible photo-electronic devices. It is better compared to Ag nanomesh in both flexibility and transparency. Moreover, other metal (including Ag and Cu) nanomeshes are prone to be oxidized, leading to a deterioration of electrical and optical properties. For example, conventional solution processed Ag nanomeshes have a dramatic decrease of conductivity annealing at 200° C. or higher for more than 20 min. Cu nanowires are severely oxidized even at room temperature without protection for days. In comparison, Au nanomeshes do not have this oxidation problem and can work at high temperatures up to at least 500° C. In addition, compared to metal nanomeshes made of conventional solution processed metal nanowires, which are quite rough, the metal nanomeshes fabricated herein are more compatible to lithographic process and are possibly used to make microcircuit with a feature size of several microns, which is unavailable by using conventional solution processed Ag nanowire networks.

In conclusion, disclosed are Au nanomeshes fabricated via a non-lithographic bilayer lift-off metallization process, in which the mask layer originates from a self-assembled metallic In film. The nanowire width, mesh size, and thickness of the nanomesh are well tunable. The metal nanomesh supported on silicon substrate can be wedged onto water and further transferred intact to any hydrophobic or hydrophilic substrates. The surface tension of water supports the metal nanomesh on water and also keeps it unfolded. The Au nanomesh presents excellent flexibility ($R/R_0$=12.3 and $R_s/R_{s0}$=3.2 at $\varepsilon$=160%), good specular transmission (82.5%), and quite small dispersed transmittance (about 3%), much better than that of Ag nanomeshes. Also, the Au nanomesh has good thermal stability even heating up to 450° C.

While exemplary embodiments of the invention have been shown and described, modifications thereof can be made by one skilled in the art without departing from the scope or teachings herein. The embodiments described herein are exemplary only and are not limiting. Many variations and modifications of the compositions, systems, apparatus, and processes described herein are possible and are within the scope of the invention. Accordingly, the scope of protection is not limited to the exemplary embodiments described herein, but is only limited by the claims that follow, the scope of which shall include all equivalents of the subject matter of the claims. Unless expressly stated otherwise, the steps in a method claim may be performed in any order and with any suitable combination of materials and processing conditions.

What is claimed is:

1. A composite filter comprising:
   a dielectric stack, comprising:
   a first dielectric layer and a third dielectric layer of a first composition;
   a second dielectric layer and a fourth dielectric layer of a second composition,
   wherein the first composition is different from the second composition;
   wherein the second dielectric layer is in direct contact with the first dielectric layer and the third dielectric layer, and wherein the third dielectric layer is in direct contact with the second dielectric layer and the fourth dielectric layer; and
   a nanomesh structure disposed in direct contact with the first dielectric layer of the dielectric stack, wherein the nanomesh structure comprises a plurality of randomly woven metallic serpentines and a plurality of holes between the serpentines.

2. The composite filter of claim 1, wherein the plurality of metallic serpentines is comprised of at least one of gold (Au), copper (Cu), or silver (Ag), or alloys and combinations thereof.

3. The composite filter of claim 1, wherein each serpentine of the plurality of metallic serpentines is less than about 200 nm thick.

4. The composite filter of claim 1, wherein each serpentine of the plurality of metallic serpentines is greater than about 20 nm thick.

5. The composite filter of claim 1, wherein each serpentine of the plurality of metallic serpentines is greater than about 50 nm thick.

6. The composite filter of claim 1, wherein the first composition comprises at least one of $TiO_2$, $SiO_2$, or $Al_2O_3$, and wherein the second composition is different than the first composition.

7. The composite filter of claim 1, wherein the first composition comprises a first type of oxide, and wherein the second composition comprises a different type of oxide from the first type of oxide.

8. The composite filter of claim 1, wherein each hole of the plurality of holes is less than about 5 microns.

9. The composite filter of claim 1, wherein each hole of the plurality of holes is less than about 1 micron.

10. The composite filter of claim 1, wherein each hole of the plurality of holes is less than about 0.8 micron.

11. The composite filter of claim 1, wherein each hole of the plurality of holes is greater than about 0.3 micron.

12. The composite filter of claim 1, further comprising a substrate in contact with the nanomesh structure.

13. The composite filter of claim 1, wherein the substrate is transparent.

14. The composite filter of claim 1, wherein the substrate is opaque.

15. The composite filter of claim 1, wherein the substrate is semi-transparent.

16. The composite filter of claim 1, wherein each of the first, second, third, and fourth dielectric layers is substantially parallel to the nanomesh structure.

17. The composite filter of claim 1, wherein the composite filter has a transmittance of about 85% in a range from 300 nm to 850 nm.

18. The composite filter of claim 1, wherein the nanomesh structure comprises a flexibility of at least 100% strain.

19. The composite filter of claim 1, wherein the nanomesh structure comprises a sheet resistance of less than 30 Ω/□.

20. A composite filter comprising:
a dielectric stack, comprising:
  a first dielectric layer and a third dielectric layer of a first composition;
  a second dielectric layer and a fourth dielectric layer of a second composition,
wherein the first composition is different from the second composition;
  wherein the second dielectric layer is in direct contact with the first dielectric layer and the third dielectric layer, and wherein the third dielectric layer is in direct contact with the second dielectric layer and the fourth dielectric layer, wherein the first composition comprises at least one of $TiO_2$, $SiO_2$, or $Al_2O_3$; and
a nanomesh structure disposed in direct contact with the first dielectric layer of the dielectric stack, wherein the nanomesh structure comprises a plurality of randomly woven metallic serpentines and a plurality of holes between the serpentines.

* * * * *